US010700890B1

(12) United States Patent
Kalyanaraman et al.

(10) Patent No.: US 10,700,890 B1
(45) Date of Patent: Jun. 30, 2020

(54) SPANNING TREE PROTOCOL PORT-BASED LINK SELECTION SYSTEM

(71) Applicant: Dell Products L.P., Round Rock, TX (US)

(72) Inventors: Vigneshwar Kalyanaraman, Tamil Nadu (IN); Aravind Prasad Sridharan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/290,556

(22) Filed: Mar. 1, 2019

(51) Int. Cl.
*H04L 12/44* (2006.01)
*H04L 12/935* (2013.01)
*H04L 12/24* (2006.01)
*H04L 12/709* (2013.01)
*H04L 12/751* (2013.01)

(52) U.S. Cl.
CPC .......... *H04L 12/44* (2013.01); *H04L 41/0886* (2013.01); *H04L 41/12* (2013.01); *H04L 45/08* (2013.01); *H04L 45/245* (2013.01); *H04L 49/3027* (2013.01)

(58) Field of Classification Search
CPC ..... H04L 12/44; H04L 41/0886; H04L 41/12; H04L 45/08; H04L 45/245; H04L 49/3027
See application file for complete search history.

(56) References Cited

U.S. PATENT DOCUMENTS

2016/0127168 A1* 5/2016 Ramalingam ....... H04L 41/0654
370/216
2017/0063614 A1* 3/2017 Hartwig .............. H04L 41/0886

* cited by examiner

*Primary Examiner* — Kyaw Z Soe
(74) *Attorney, Agent, or Firm* — Haynes and Boone, LLP

(57) ABSTRACT

An STP link selection system includes a designated switch device that receives a first communication that indicates that a first link provided to a non-designated switch device from a first port is available and, in response, automatically assigns the first port with a primary port priority. The designated switch device then subsequently receives a second communication that indicates that a second link provided to the non-designated switch device via a second port is available and, in response, the second port is automatically assigned with a secondary port priority. The designated switch device identifies a first port identifier that is based on the primary port priority to the non-designated switch device and, based on the first port identifier relative to a second port identifier that is based on the secondary port priority, the non-root switch device transmits communications via the first link and blocks communications via the second link.

20 Claims, 25 Drawing Sheets

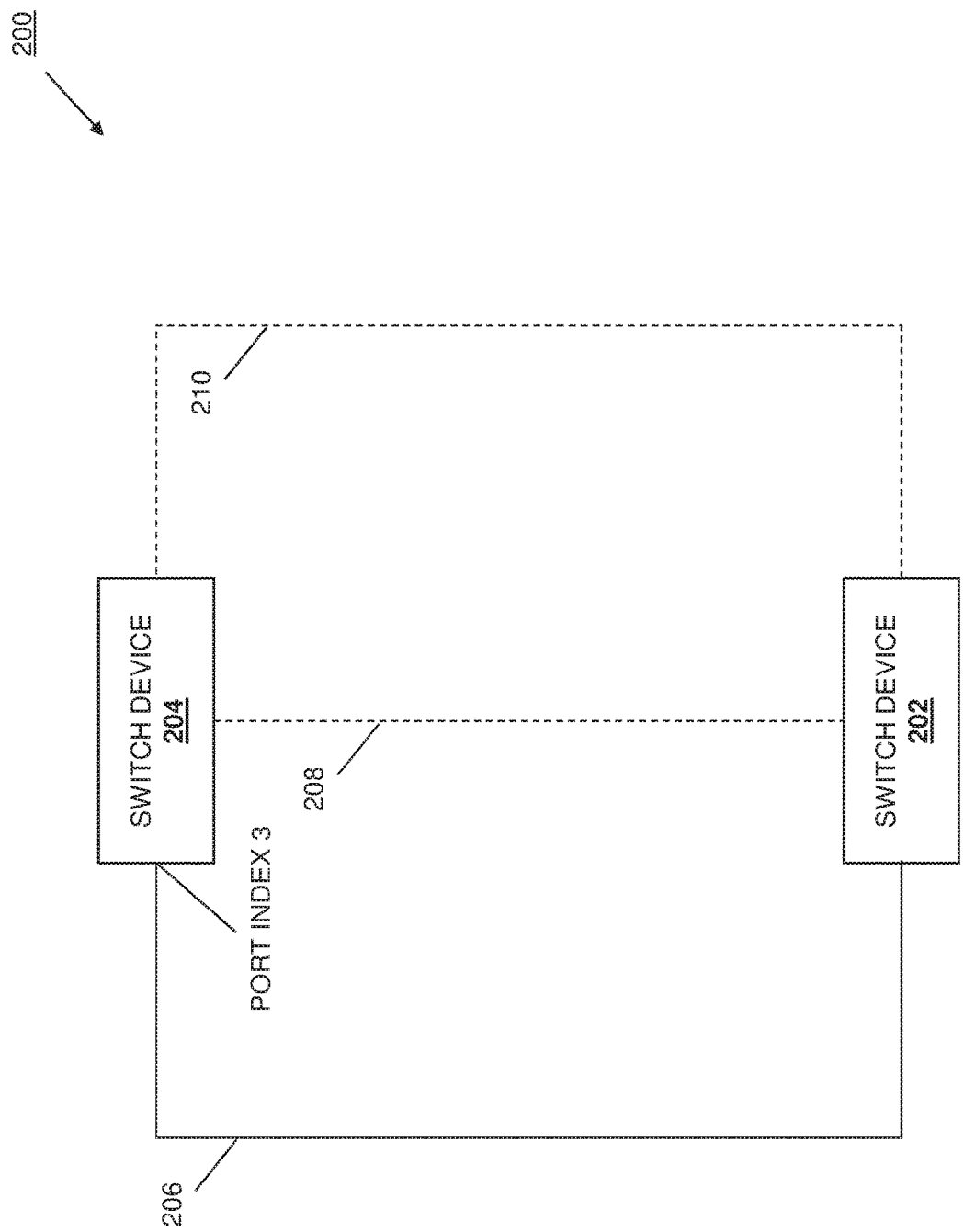

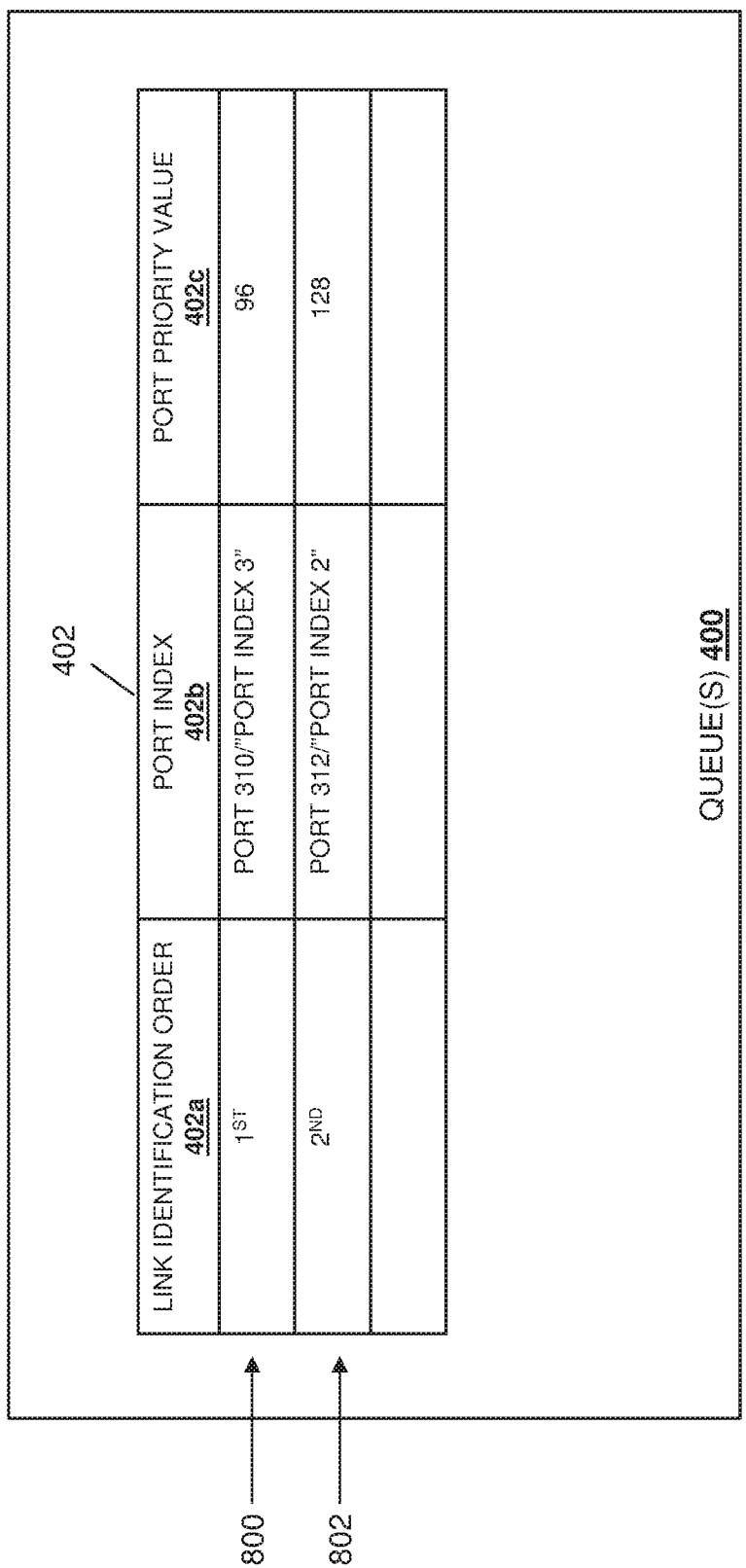

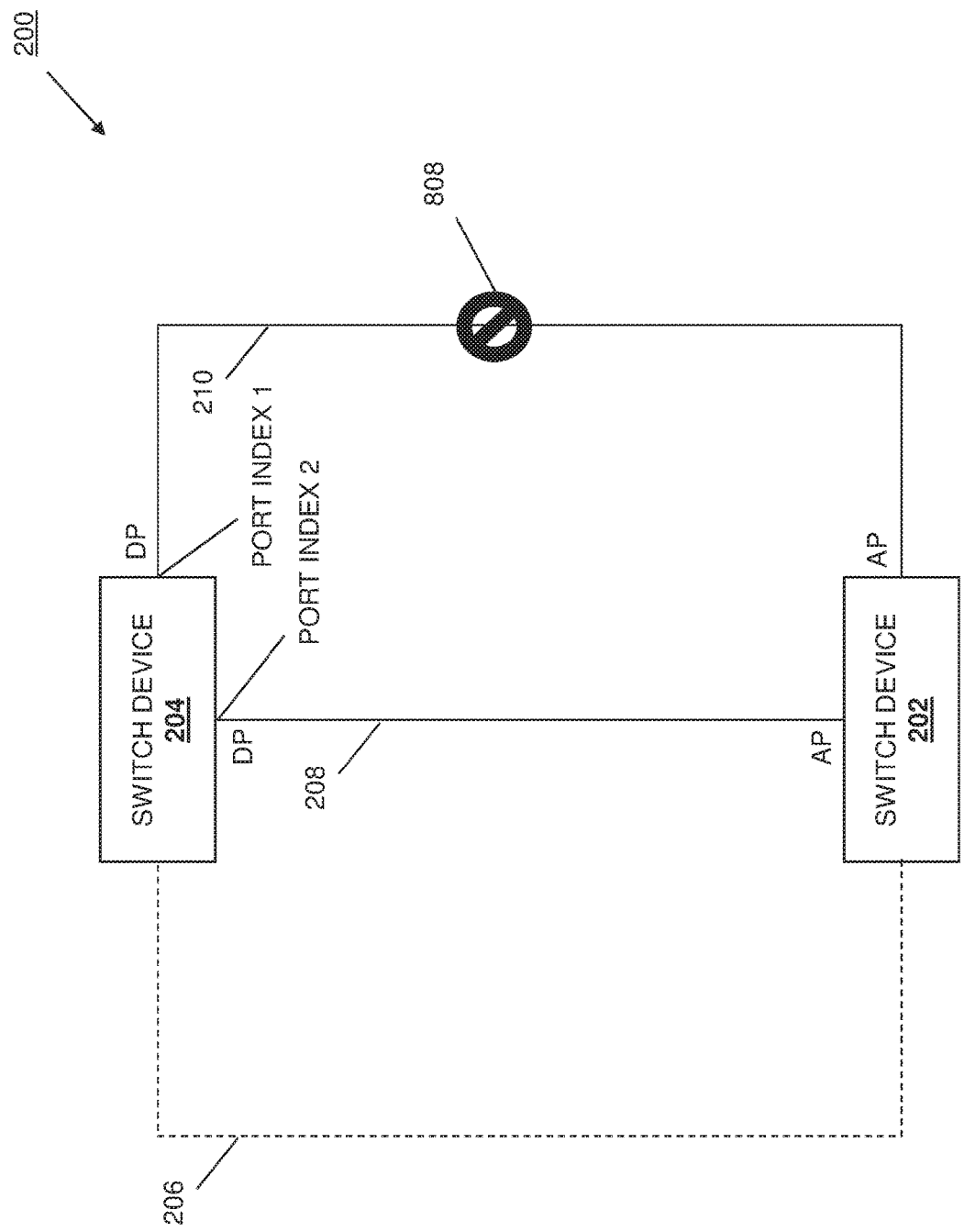

SPANNING TREE PROTOCOL PORT-BASED LINK SELECTION SYSTEM

BACKGROUND

The present disclosure relates generally to information handling systems, and more particularly to selecting Spanning Tree Protocol (STP) links for communication between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, sometimes utilize the Spanning Tree Protocol (STP) for transmitting traffic through a network. As would be understood by one of skill in the art, the STP is a network protocol that builds a loop-free logical topology for Ethernet/Layer 2 (L2) networks, and operates to prevent bridge loops and the broadcast radiation that results from them, while allowing a network design that includes backup links that provide fault tolerance if an active link fails. The STP may be utilized to create a spanning tree within a network of connected layer-2 bridges (e.g., the switch devices discussed above), and disables those links that are not part of the spanning tree, leaving a single active link between any two network nodes. The active link provided between any two switch devices may be provided by a "designated port" on a "root/designated switch device" and a "root port" on a "non-root/non-designated switch device" (also referred to a "root-designated pair"), while the non-active links may be provided by a "designated port" on that root/designated switch device and an "alternate port" on that non-root/non-designated switch device (also referred to a "alternate-designated pair"). In many examples, one of the switch devices is selected as a root/designated switch device based on its root bridge identifier being lower than any of the other switch devices, and the active link for each non-root/non-designated switch device may be selected amongst a plurality of different links available between the directly connected root switch device or designated switch device and that non-root/non-designated switch device first based on relative root path costs, then based on the lowest designated bridge identifiers if the root path costs associated with the links are the same, and then based on the lowest designated port identifiers if the designated bridge identifiers associated with the links are the same. The use of the designated port identifier in selecting the active link can raise a number of issues.

Typically, the selection of a port on a non-root/non-designated switch device as a root port is based on that port receiving the lowest designated port identifier from the directly connected root/designated switch device (relative to the other ports that are included on the non-root/non-designated switch device and that provide a link to the directly connected root/designated switch device), while the remaining links provided by those other ports are considered non-active links (i.e., links that are blocked from forwarding data traffic). However, subsequent to this STP active link selection, if a port provides a new link to the directly connected root/designated switch device that becomes available and receives a lower designated port identifier from the root/designated switch device, the active link selection process is repeated so that the new link may be selected as the active link (i.e., due to it having received the lowest designated port identifier from the directly connected root/designated switch device.) As such, each time a new port on the directly connected root/designated switch device having a lower port identifier (i.e., relative to the port on the root/designated switch device that is currently providing the active link) has its associated link become available, the STP triggers a topology-change event and traffic is forced to reconverge on that new link due to its selection as the new active link. Similarly, in links between root/designated switch devices and non-root/non-designated switch devices provided in Link Aggregation Groups (LAGs), when a first port channel that provides a first LAG that is provided on the root/designated switch device is selected as the active LAG, and a second port channel that provides a second LAG that is provided on the root/designated switch device and that includes a lower port channel identifier than that of the first port channel becomes available at a later time, the active LAG selection process will be repeated to select that second LAG as the active LAG, which interrupts traffic that was being transmitted over the first LAG.

The repeating of the STP active link selection process/reconvergence operations is associated with considerable overhead, including the performance of STP port re-selection operations, hardware port state re-programming, Media Access Control (MAC) address flushing, MAC address re-learning, and/or other STP tasks known in the art. Furthermore, as discussed above, the STP active link selection process/reconvergence operations can also result in traffic disruptions that can lead to data loss. Conventional solutions to these issues may be realized via a feature in the STP that allows a network administrator or other user to manually configure port priorities of port (or port channel priorities of port channels) in order to override the selection of the active link (or active LAG) via the port identifiers and port channel identifiers discussed above. However, such processes are time consuming, and in relatively large switch device/network deployments with relatively large numbers of links or LAGs, the time and effort needed to assign port priorities to each port (or port channel priorities to port channels) in the switch devices/network is considerable. Furthermore, even with manual port priority configuration, the issues associated with ports/links (or port channels/LAGs) becoming available at a later time (i.e., after the active link or active LAG has been selected) remains, and in LAG situations it is often not possible to determine the order in which different LAGs will become available. As such, manual port priority configuration does not resolve the potential of traffic disruptions and/or data losses that can occur due to the repeating of the STP active link selection process/reconvergence operations discussed above.

Accordingly, it would be desirable to provide an improved STP link selection system.

SUMMARY

According to one embodiment, an Information Handling System (IHS) includes a processing system; and a memory system that is coupled to the processing system and that includes instructions that, when executed by the processing system, cause the processing system to provide a Spanning Tree Protocol (STP) link selection engine that is configured to: receive, from a first port, a first communication that indicates that a first link provided to a non-designated switch device via the first port is available; automatically assign, in response to receiving the first communication, the first port with a primary port priority; receive, from a second port and subsequent to receiving the first communication from the first port, a second communication that indicates that a second link provided to the non-designated switch device via the second port is available wherein the second port is automatically assigned a secondary port priority that is different than the primary port priority; identify, to the non-designated switch device, a first port identifier that is based on the primary port priority assigned to the first port in order to cause the non-designated switch device to transmit communications via the first link provided by the first port based on the first port identifier relative to a second port identifier that is based on the secondary port priority assigned to the second port, and block communications via the second link provided by the second port based on the second port identifier relative to the first port identifier.

BRIEF DESCRIPTION OF THE DRAWINGS

FIG. 8B is a schematic view illustrating an embodiment of the STP link selection system of FIG. 2 during the method of FIG. 7.

FIG. 8C is a schematic view illustrating an embodiment of the queue of FIG. 4 in the switch device of FIG. 3 in the STP link selection system of FIG. 2 during the method of FIG. 7.

FIG. 8H is a schematic view illustrating an embodiment of the STP link selection system of FIG. 2 during the method of FIG. 7.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
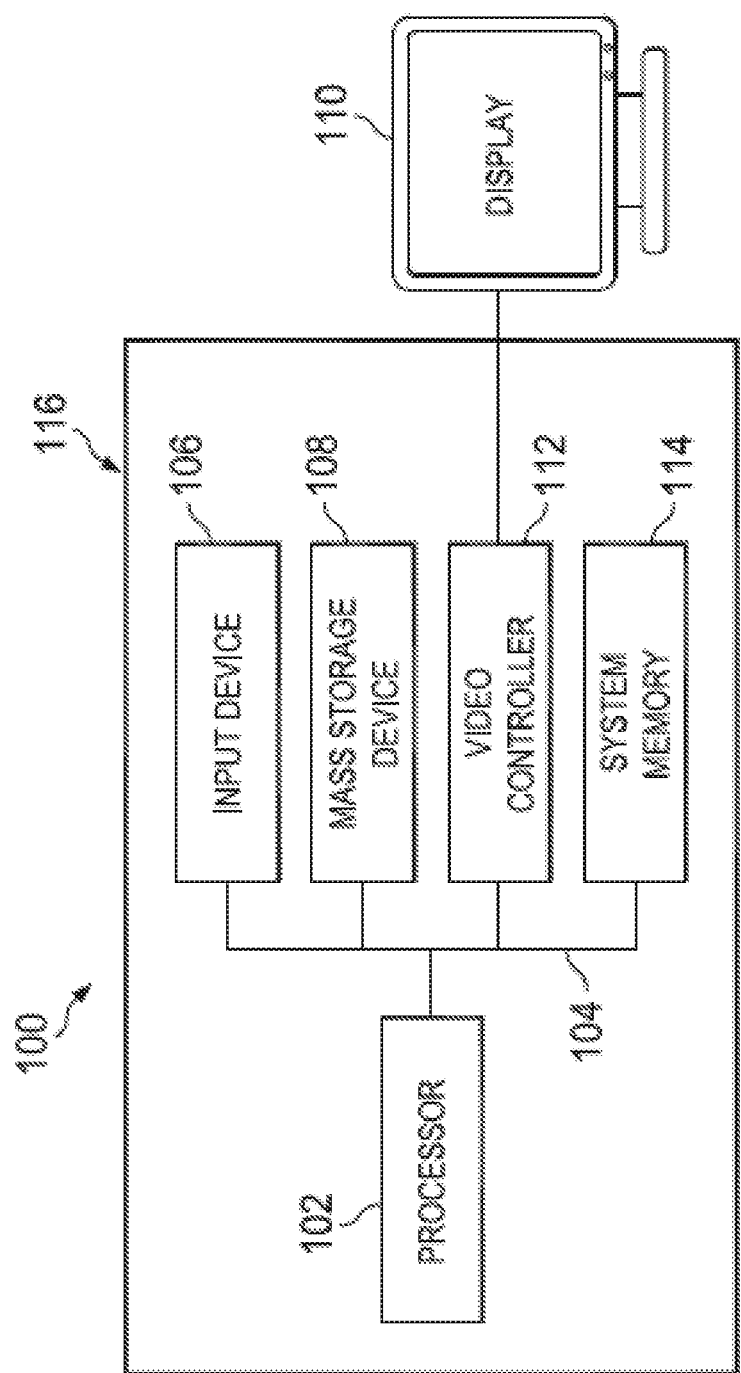
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
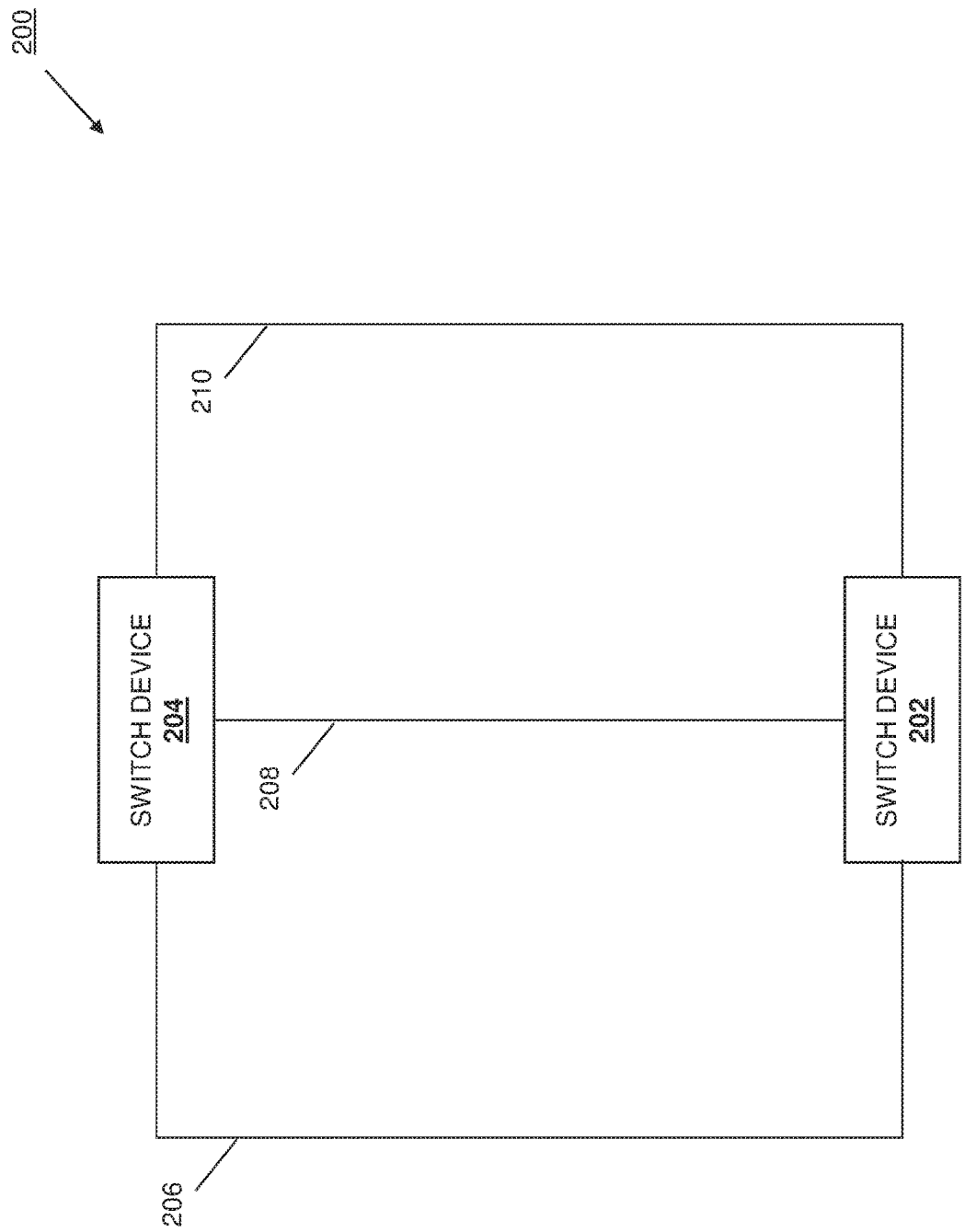
FIG. 2 is a schematic view illustrating an embodiment of an STP link selection system.

Referring now to FIG. 2, an embodiment of a Spanning Tree Protocol (STP) link selection system 200 is illustrated. In the illustrated embodiment, the STP link selection system 200 includes a switch device 202 that is coupled to a switch device 204 by a first connection 206 (e.g., provided by an Ethernet cable connected to respective ports on the switch devices 202 and 204), a second connection 208 (e.g., provided by an Ethernet cable connected to respective ports on the switch devices 202 and 204), and a third connection 210 (e.g., provided by an Ethernet cable connected to respective ports on the switch devices 202 and 204). In an embodiment, either or both of the switch devices 202 and 204 may be provided by the IHS 100 discussed above with reference to FIG. 1, and/or may include some or all of the components of the IHS 100. However, while illustrated and discussed as a switch device, one of skill in the art in possession of the present disclosure will recognize that switch devices 202 and/or 204 provided in the system 200 may include other networking devices, and/or any devices that may be configured to operate similarly as discussed below. While only two switch devices 202 and 204 are illustrated in FIG. 2, one of skill in the art in possession of the present disclosure will recognize that many more switch devices may (and typically will) be coupled together (e.g., an a datacenter) while remaining within the scope of the present disclosure. While a specific STP link selection system 200 has been illustrated and described, one of skill in the art in possession of the present disclosure will recognize that the STP link selection system of the present disclosure may include a variety of components and component configurations while remaining within the scope of the present disclosure as well.

Figure 3:
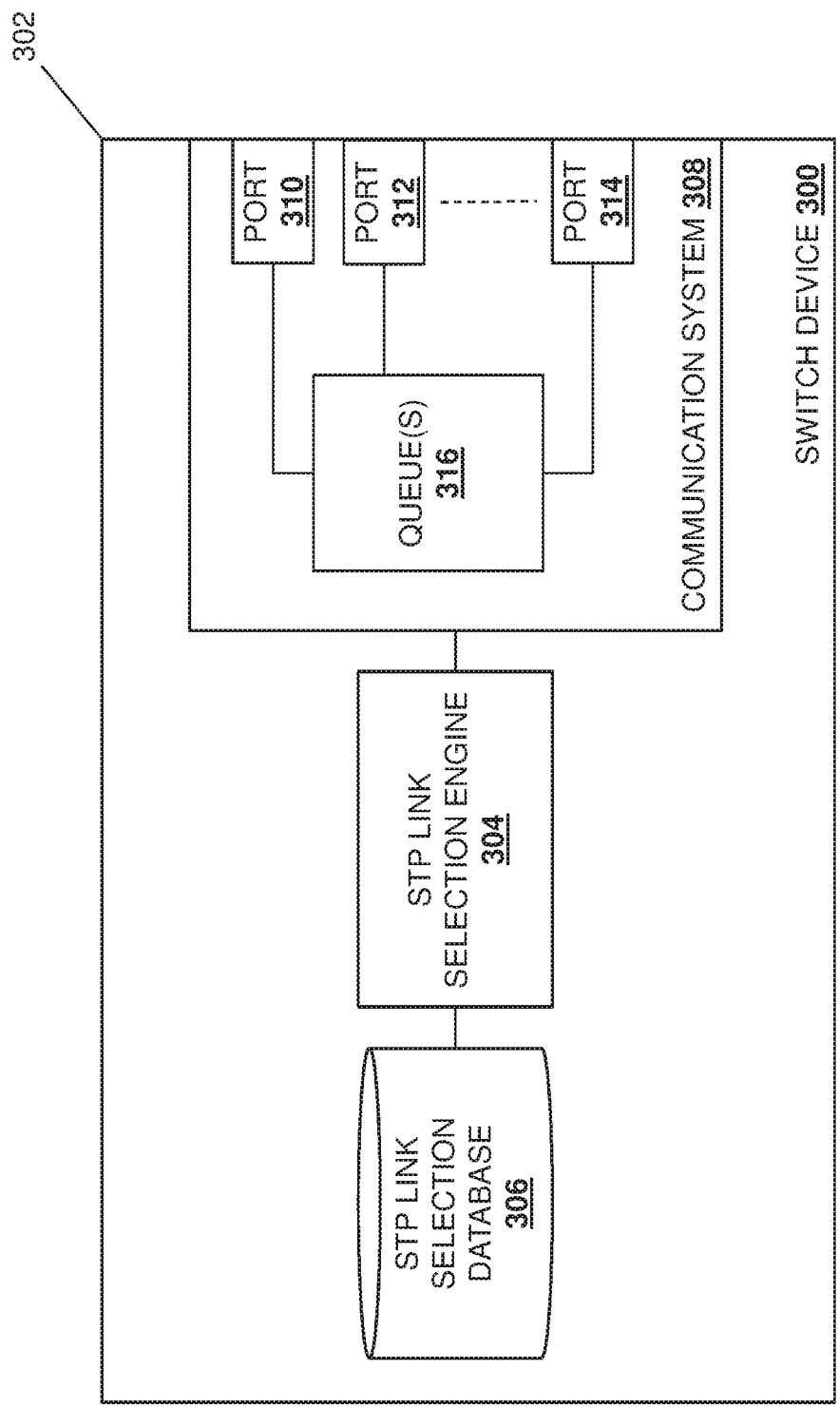
FIG. 3 is a schematic view illustrating an embodiment of a switch device that may be provided in the STP link selection system of FIG. 2.

Referring now to FIG. 3, an embodiment of a switch device 300 is illustrated that may provide either or both of the switch devices 202 and 204 discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device 300, one of skill in the art in possession of the present disclosure will recognize that the functionality of the switch device 300 discussed below may be provided by other networking devices and/or other devices that are configured to operate similarly as discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an STP link selection engine 304 that is configured to perform the functionality of the STP link selection engines and/or switch devices discussed below.

The chassis 302 may also house a storage system (not illustrated, but which may include the storage 108 discussed above with reference to FIG. 1) that is coupled to the STP link selection engine 304 (e.g., via a coupling between the storage system and the processing system) and that includes an STP link selection database 306 that is configured to store any of the information utilized by the STP link selection engine 304 discussed below. The chassis 302 may also house a communication system 308 that is coupled to the STP link selection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the embodiment illustrated in FIG. 3, the communication includes a plurality of ports 310, 312, and up to 314. Furthermore, FIG. 3 illustrates how one or more queues 316 may be provided for the ports 310-314.

However, while illustrated as part of the communication system 308 and connected to the ports 310-314, one of skill in the art in possession of the present disclosure will recognize that the queues described herein may be provided by and/or included in the SPT link selection engine (e.g., as queues provided in hardware such as the processing system that provides the STP link selection engine 304) while remaining within the scope of the present disclosure as well. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
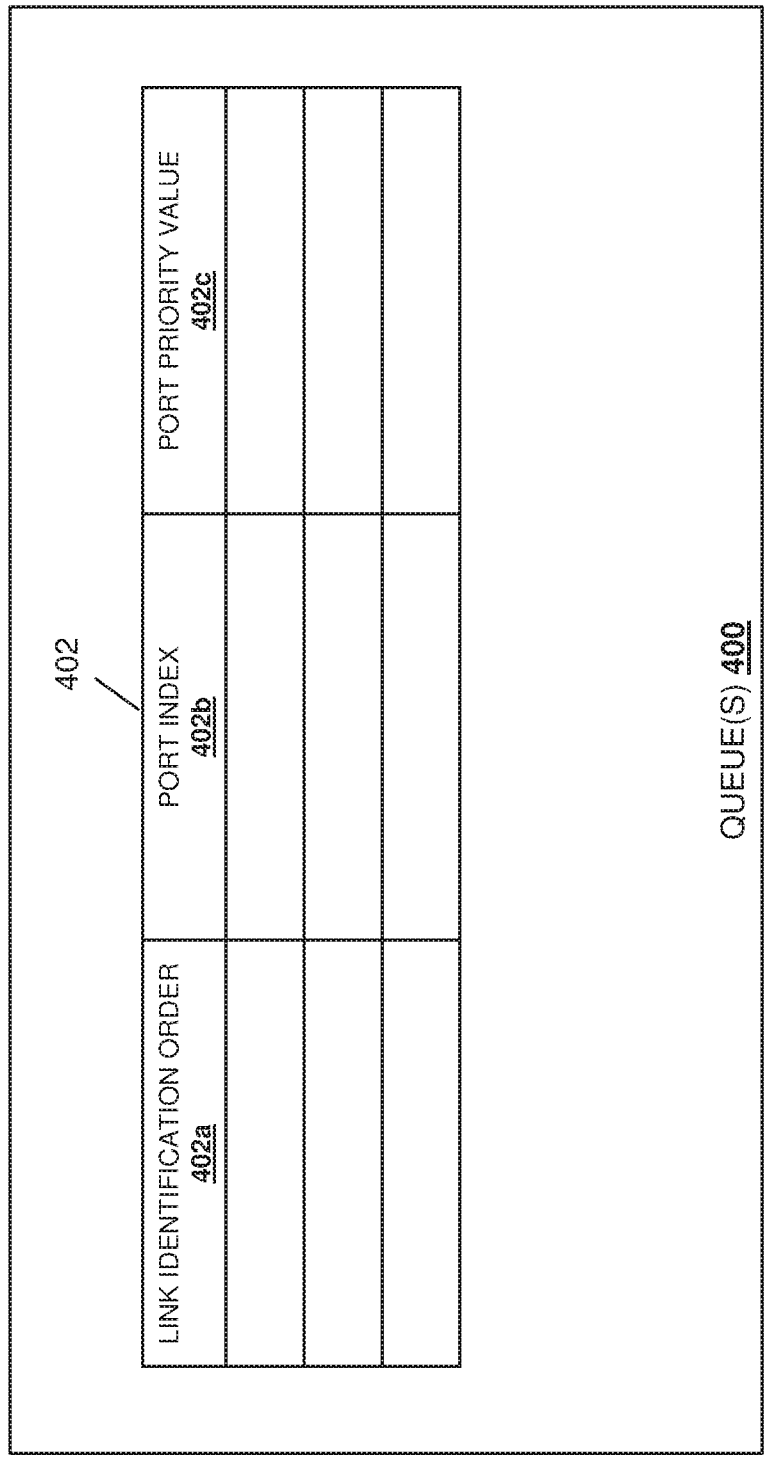
FIG. 4 is a schematic view illustrating an embodiment of a queue that may be provided in the switch device of FIG. 3 in the STP link selection system of FIG. 2.

Referring now to FIG. 4, an embodiment of queue(s) 400 that may provide the queue(s) 316 discussed above with reference to FIG. 3 are illustrated. In some embodiments of the present disclosure, the queue(s) 316/400 provided in the switch device 300 in the STP link selection system will include a respective queue for each STP-enabled switch device that is connected to the switch device 300. In the examples provided below, the queue(s) 400 are provided for the switch device 204/300 when that switch device 204/300 is included in the STP link selection system 200 discussed above with reference to FIG. 2 and, as such, a single queue 402 is included in the queue(s) 316/400 (e.g., because the switch device 204/300 is coupled to a single STP enabled switch device 202.) However, one of skill in the art in possession of the present disclosure will recognize that additional queues may be included in the queue(s) 316/400 in the switch device 204/300 as additional STP-enabled switch devices are connected to the switch device 204/300. In the illustrated embodiment, the queue 402 includes a link identification order column 402a, a port index column 402b, and a port priority value column 402c.

As discussed in further detail below, for any port on the switch device 204/300 that is connected to the switch device 204, any particular row in the queue 402 may store an order in which the link provided to the switch device 202 by that port was identified as available in the link identification order column 402a, a port index for that port in the port index column 402b, and a port priority value assigned to that port in the port priority value column 402c. As would be understood by one of skill in the art in possession of the present disclosure, a port identifier for a port may be defined as a combination of a port index for that port and a port priority for that port. Thus, the port index column 402b and the port priority value column 402c may provide values that are combined to provide a port identifier for the associated port. However, while a specific queue 402 is illustrated and described herein, one of skill in the art in possession of the present disclosure will recognize that a variety of data/storage structures may be utilized to provide the functionality discussed below while remaining within the scope of the present disclosure as well.

Figure 5:
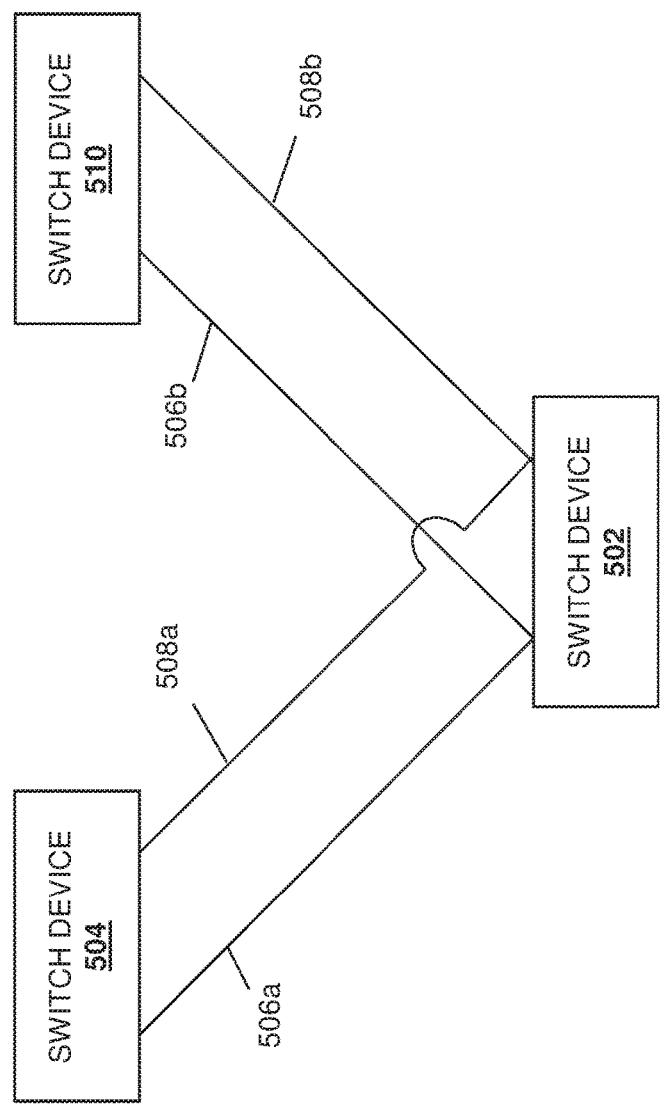
FIG. 5 is a schematic view illustrating an embodiment of an STP link selection system that may include the switch device of FIG. 3.

Referring now to FIG. 5, an embodiment of an STP link selection system 500 is illustrated. In the illustrated embodiment, the STP link selection system 500 includes a switch device 502 that is coupled to a switch device 504 by a plurality of connections 506a and 508a (e.g., provided by respective Ethernet cables each connected to respective ports on the switch devices 502 and 504), and that is coupled to a switch device 510 by a plurality of connections 506b and 508b (e.g., provided by respective Ethernet cables each connected to respective ports on the switch devices 502 and 504). In an embodiment, any of the switch devices 502, 504, and 506 may be provided by the IHS 100 discussed above with reference to FIG. 1, and/or may include some or all of the components of the IHS 100. Furthermore, in the examples provided below, the switch device 300 may provide any or all of the switch devices 502, 504, and 510. However, while illustrated and discussed as switch devices, one of skill in the art in possession of the present disclosure will recognize that switch devices 502, 504, and 506 provided in the system 500 may include other networking devices, and/or any devices that may be configured to operate similarly as discussed below. While only three switch devices 502, 504, and 506 are illustrated in FIG. 5, one of skill in the art in possession of the present disclosure will recognize that many more switch devices may (and typically will) be coupled together (e.g., an a datacenter) while remaining within the scope of the present disclosure. While a specific STP link selection system 500 has been illustrated and described, one of skill in the art in possession of the present disclosure will recognize that the STP link selection system of the present disclosure may include a variety of components and component configurations while remaining within the scope of the present disclosure as well.

Figure 6:
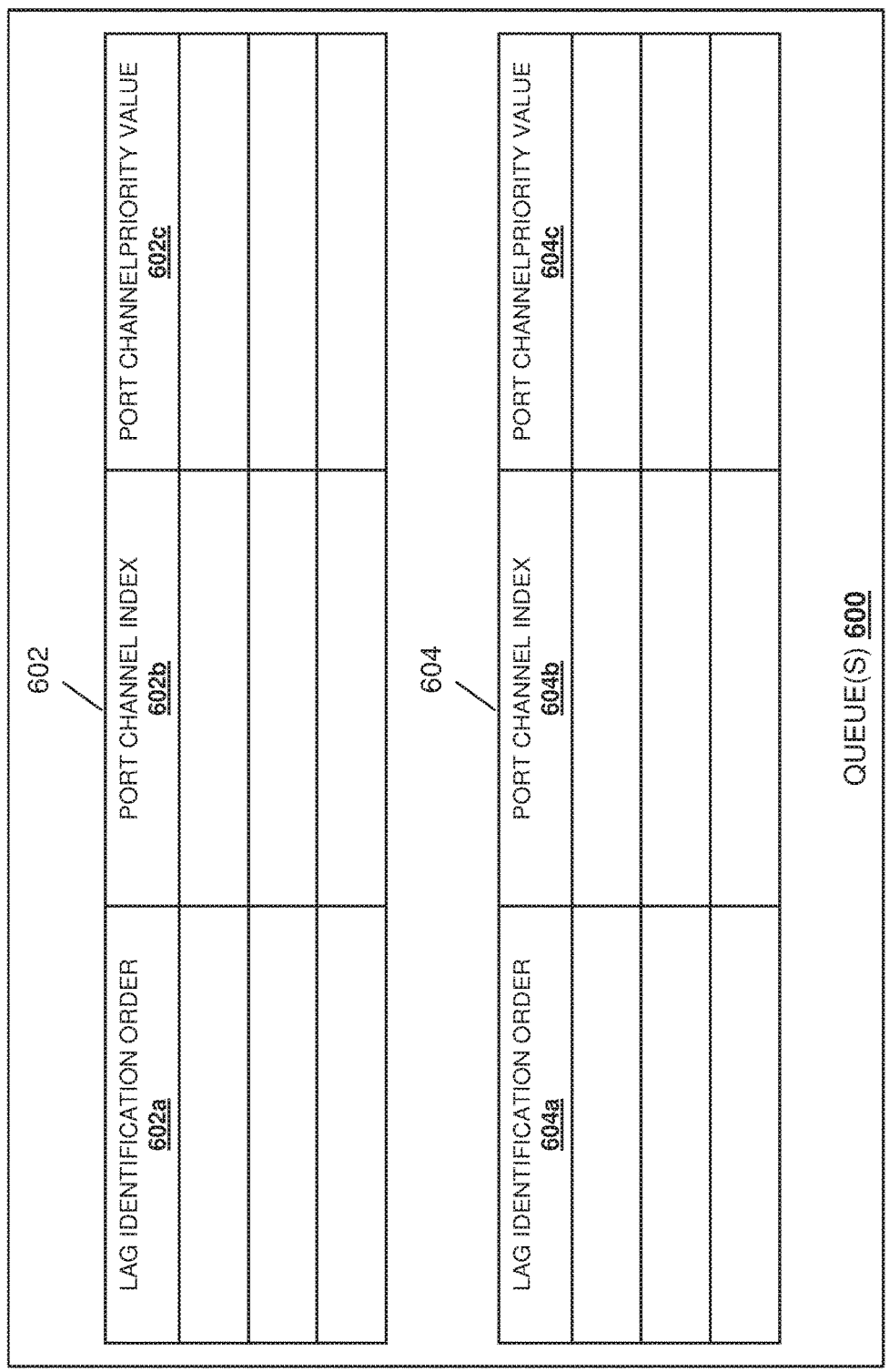
FIG. 6 is a schematic view illustrating an embodiment of a queue that may be provided in the switch device of FIG. 3 in the STP link selection system of FIG. 5.

Referring now to FIG. 6, an embodiment of queue(s) 600 that may provide the queue(s) 316 discussed above with reference to FIG. 3 are illustrated. As discussed above, in some embodiments of the present disclosure, the queue(s) 316/600 provided in the switch device 300 in the STP link selection system will include a respective queue for each STP-enabled switch device that is connected to the switch device 300. In the examples provided below, the queue(s) 600 are provided for the switch device 502/300 when that switch device 502/300 is included in the STP link selection system 500 discussed above with reference to FIG. 5 and, as such, a pair of queues 602 and 604 are included in the queue(s) 316/600 (e.g., because the switch device 502/300 is coupled to a pair of STP enabled switch devices 504 and 510, with the queue 602 provided for the switch device 504, and the queue 604 provided for the switch device 510.) However, one of skill in the art in possession of the present disclosure will recognize that additional queues may be included in the queue(s) 316/600 in the switch device 502/300 as additional STP-enabled switch devices are connected to the switch device 502/300. In the illustrated embodiment, the queue 602 includes a LAG identification order column 602a, a port channel index column 602b, and a port channel priority value column 602c; while the queue 604 includes a LAG identification order column 604a, a port channel index column 604b, and a port channel priority value column 604c. As would be understood by one of skill in the art in possession of the present disclosure, a port channel identifier for a port channel may be defined as a combination of a port channel index for that port channel and a port channel priority for that port channel. Thus, the port channel index columns 602b and 604b and port channel priority value columns 602c/604c may each provide values that are combined to provide a port channel identifier for the associated port channel.

As discussed in further detail below, links provided by the ports on the switch device 502/300 may be provided in Link Aggregation Groups (LAGs) using, for example, Virtual Link Trunking (VLT) techniques, which one of skill in the art in possession of the present disclosure will recognize are provided via the proprietary VLT aggregation protocol available from DELL® Inc. of Round Rock, Tex., United States. However, one of skill in the art in possession of the present disclosure will recognize that other aggregation protocols will fall within the scope of the present disclosure as well. For ports on the switch device 502/300 that are connected to the switch device 504 and that provide links that are part of a LAG, any particular row in the queues 602 and 604 may store an order in which the LAG provided to the switch device 204 by a port channel that includes those ports was identified in the LAG identification order column 602a/604a, a port channel index for that port channel in the port channel index column 602b/604b, and a port channel priority value assigned to that port channel in the port channel priority value column 602c/604c. However, while specific queues 602 and 604 are illustrated and described herein, one of skill in the art in possession of the present disclosure will recognize that a variety of data/storage structures may be utilized to provide the functionality discussed below while remaining within the scope of the present disclosure as well.

Figure 7:
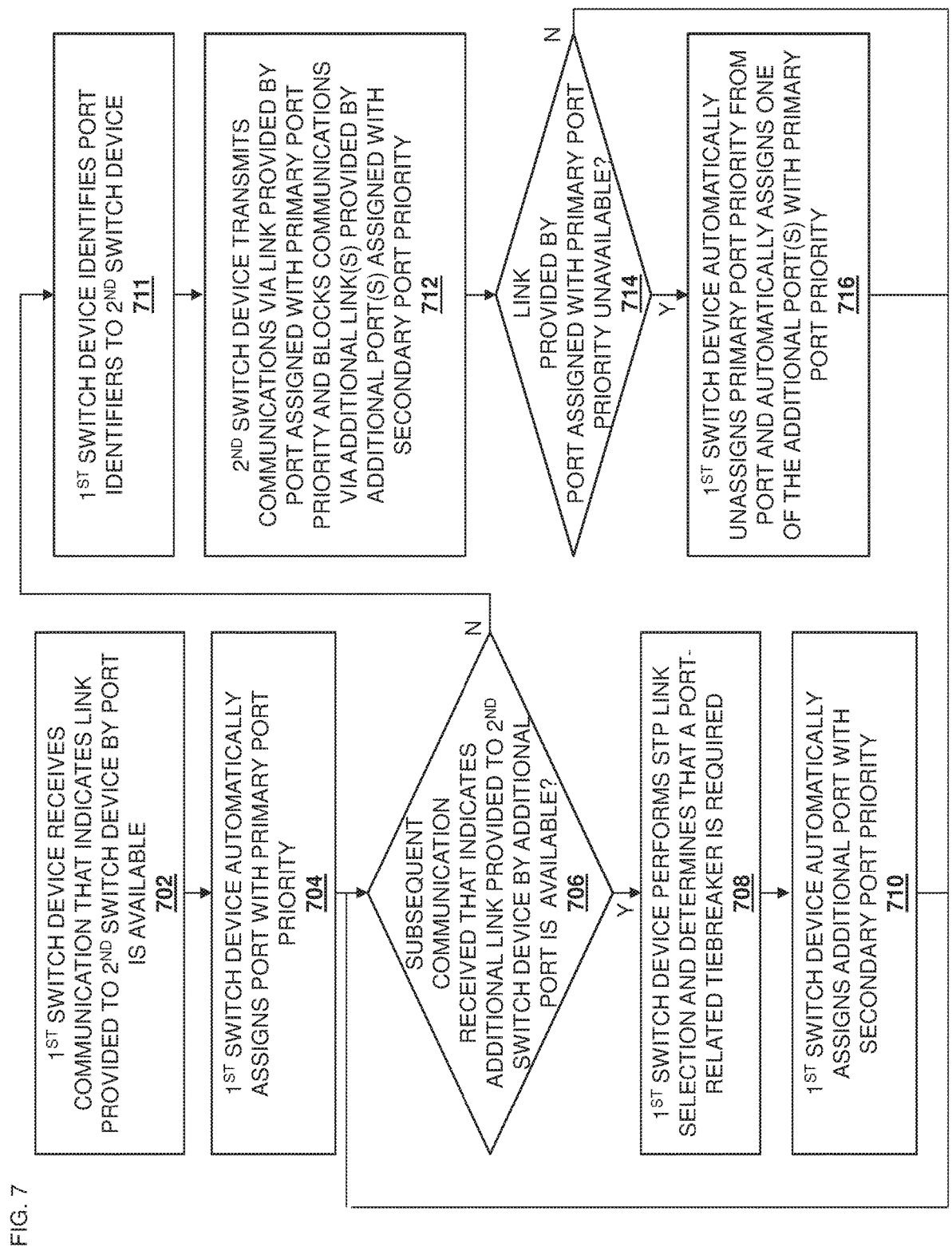
FIG. 7 is a flow chart illustrating an embodiment of a method for selecting STP links.

Referring now to FIG. 7, an embodiment of a method 700 for selecting STP links is illustrated. As discussed below, the systems and methods of the present disclosure provide for port-related tiebreaker STP link selection via the automatic assignment of a primary port priority to the port that provides the first link to the root/designated switch device that becomes available, while automatically assigning a secondary port priority to any additional ports that provide additional links to the root/designated switch device that subsequently become available. STP link selections based on the automatically assigned port priorities result in the first link that becomes available being utilized as an active link to transmit communications from the non-root/non-designated switch device to the root/designated switch device, and subsequent links that become active being non-active links that are blocked to prevent communications from being transmitted from the non-root/non-designated switch device to the root/designated switch device. As such, when links to the root/designated switch device subsequently become available, those ports are assigned the secondary port priority that makes their associated links non-active links, thus preventing the conventional functionality that results in the changing of the active link, with the associated overhead, traffic disruptions, and possible data loss discussed above.

The method 700 begins at block 702 where a first switch device receives a communication from a port that indicates that a link provided to a second switch device by that port is available. In an embodiment, at block 702, the switch devices included in the STP link selection system 200 and/or 500 may be powered on, started up, reset, booted, and/or otherwise initialized. With reference to the STP link selection system 200 of FIG. 2, as part of the initialization, the switch devices 202 and 204 may communicate in order to establish links on one or more of the first connection 206, the second connection 208, and the third connection 210 between the switch devices 202 and 204. Similarly, with reference to the STP link selection system 500 of FIG. 5, as part of the initialization, the switch devices 502, 504, and 510 may communicate in order to establish a LAG on the plurality of connections 506a-506b, and may communicate in order to establish a LAG on the plurality of connections 508a-508b. The details of the establishment of links and LAGs between switch devices would be apparent to one of skill in the art in possession of the present disclosure, and thus are not described herein in detail.

Figure 8A:
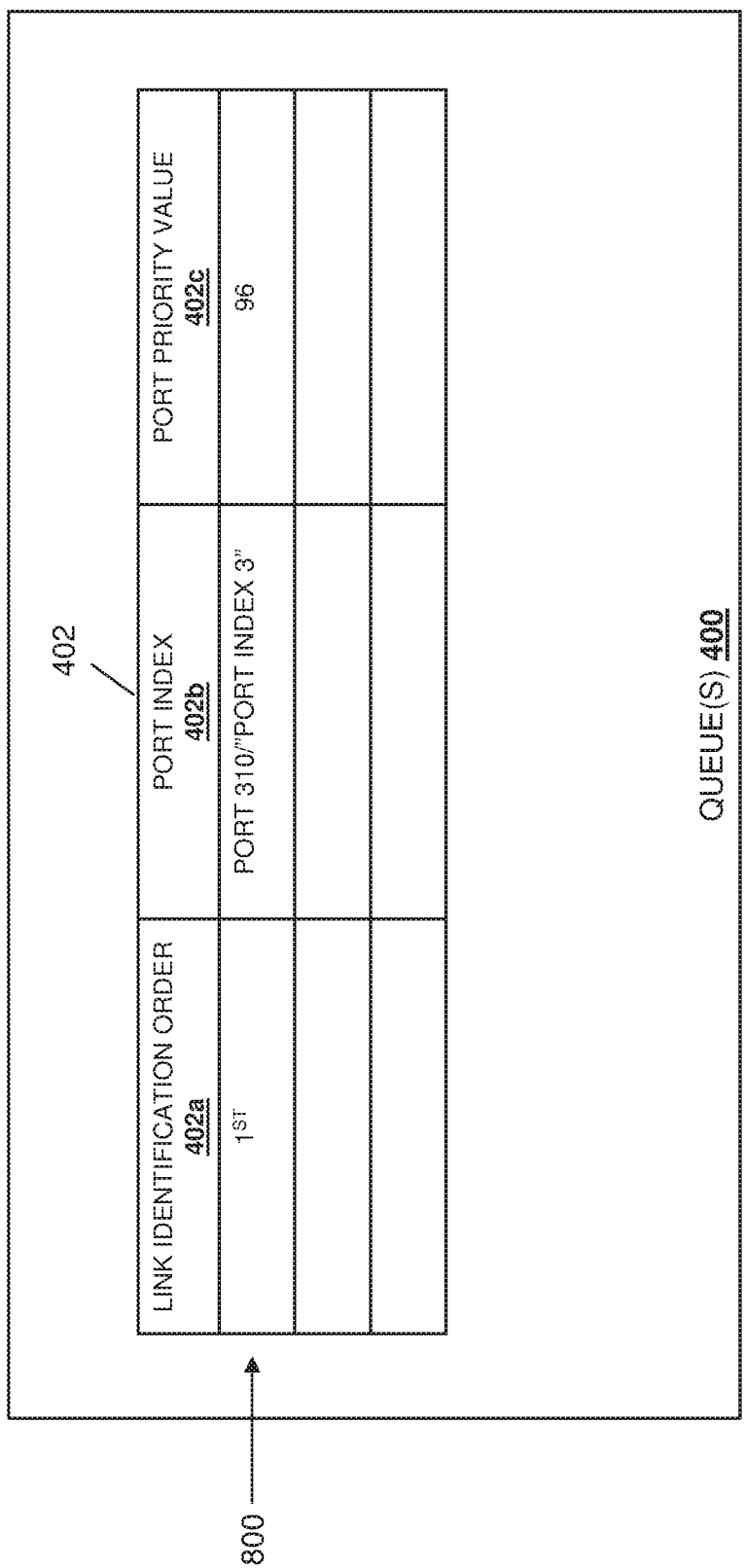
FIG. 8A is a schematic view illustrating an embodiment of the queue of FIG. 4 in the switch device of FIG. 3 in the STP link selection system of FIG. 2 during the method of FIG. 7.
Figure 9A:
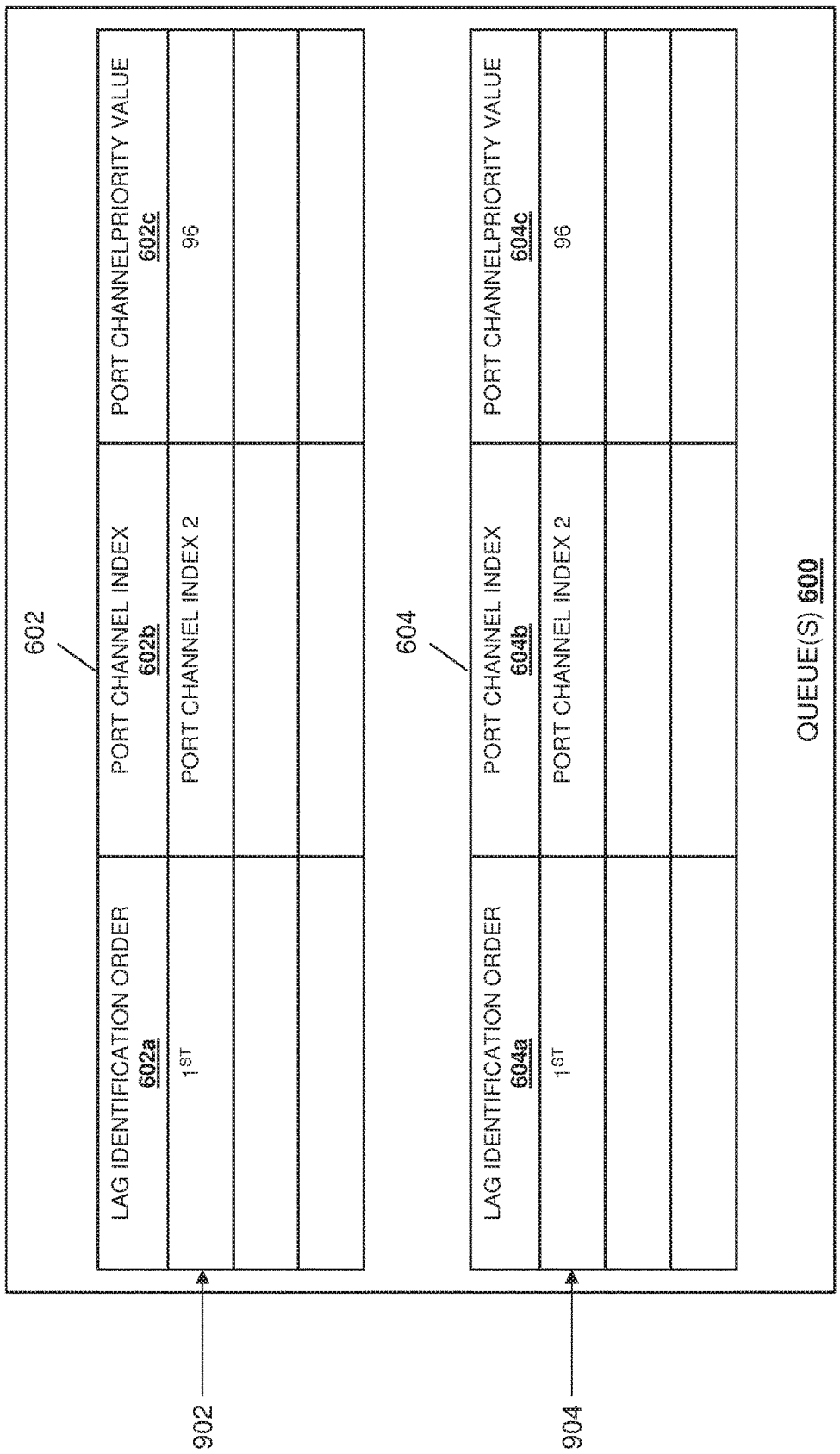
FIG. 9A is a schematic view illustrating an embodiment of the queue of FIG. 6 in the switch device of FIG. 3 in the STP link selection system of FIG. 5 during the method of FIG. 7.
Figure 9B:
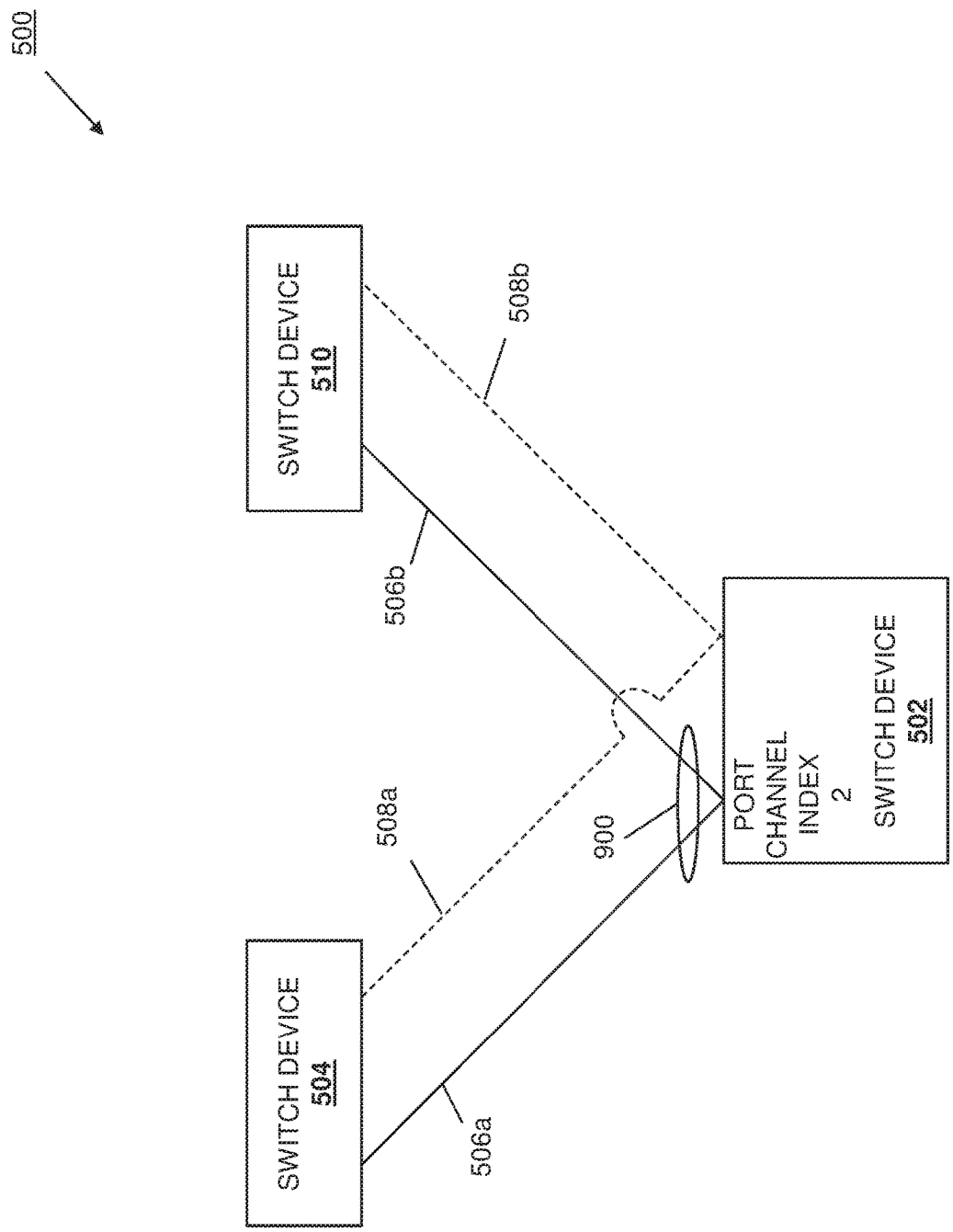
FIG. 9B is a schematic view illustrating an embodiment of the STP link selection system of FIG. 5 during the method of FIG. 7.

As such, at block 702, the STP link selection engine 304 in the switch device 204/300 may receive communications (e.g., an "Oper UP" message) from any of the ports 310-314 once the link provided via that port to the switch device 202 is available Similarly, the STP link selection engine 304 in the switch device 502/300 may receive communications when a LAG provided on the plurality of ports 506a-506b to the switch devices 504 and 510, and/or a LAG provided on the plurality of ports 508a-508b to the switch devices 504 and 510 is available. In a specific example, with reference to FIGS. 2 and 8B, a first link provided on the first connection 206 via the port 310 on the switch device 204/300 may be the first link that becomes available between the switch devices 204/300 and 202 (as illustrated by the dashed lines provided on the second connection 208 and the third connection 210 that are indicative of an unavailable link in this example), and that port 310 may include a port index "PORT INDEX 3" in this specific example. In another specific example, with reference to FIGS. 5 and 9B, a first LAG 900 provided on the connections 506a-506b via a port channel on the switch device 502/300 may be the first LAG that becomes available between the switch device 502/300 and switch devices 504 and 510, and that port channel may include a port channel index "PORT CHANNEL INDEX 2" in this specific example.

The method 700 then proceeds to block 704 where the first switch device automatically assigns the port with a primary port priority. In an embodiment, at block 704, switch devices included in the STP link selection system 200 and/or 500 may automatically assign a primary port priority to the port upon which the first link to a neighbor switch device becomes available. Continuing with the specific example directed to the STP link selection system 200 discussed above and with reference to FIGS. 8A and 8B, in response to the first link provided on the first connection 206 via the port 310 on the switch device 204/300 becoming available, the STP link selection engine 304 in the switch device 204/300 may generate a row 800 in the queue 402 that indicates that that first link was the first available link to the switch device 202 that was identified (i.e., "$1^{ST}$") in the link identification order column 402a, that includes the port index for the port 310 providing that first link (i.e., "PORT 310/"PORT INDEX 3") in the port index column 402b, and that assigns the port 310 that provides that first link a port priority value (e.g., "96") in the port priority value column 402c. As discussed above, the assignment of the port priority value to the port may provide the port identifier for that port (i.e., as a combination of the port priority and the port index.)

As would be understood by one of skill in the art in possession of the present disclosure, STP port priorities may include values of "0", "32", "64", "128", "160", "192", and "224", and the STP provides the port priority value "128" as a default value. As such, in the illustrated embodiment, the port priority value of "96" that is assigned to the port 310 that provides the first link in this example will provide that port 310 with a "primary port priority" that is selected to result in a port identifier that causes that first link to be selected as the active link to the switch device 202 over any other port with the default port priority value of "128", as discussed in further detail below. However, while specific port priority values have been described, one of skill in the art in possession of the present disclosure will recognize how different techniques may be utilized to assign a port a primary port priority that provides the same functionality discussed below while remaining within the scope of the present disclosure.

Continuing with the specific example directed to the STP link selection system 500 discussed above and with reference to FIGS. 9A and 9B, in response to the first LAG 900 provided on the connections 506a and 506b on the switch device 202/300 becoming available, the STP link selection engine 304 in the switch device 502/300 may generate a row 902 in the queue 602 that indicates that that first LAG 900 was the first available LAG to the switch devices 504 and 510 that was identified (i.e., "$1^{ST}$") in the LAG identification order column 602a, that includes the port channel index for the port channel providing that first LAG 900 (i.e., "PORT CHANNEL INDEX 2'") in the port channel index column 602b, and that assigns that first LAG 900 a port channel priority value (e.g., "96") in the port channel priority value column 602c. Similarly, the STP link selection engine 304 in the switch device 502/300 may generate a row 904 in the queue 604 that indicates that that first LAG 900 was the first available LAG to the switch devices 504 and 510 that was identified (i.e., "$1^{ST}$") in the LAG identification column 604a, that includes the port channel index for the port channel providing that first LAG 900 (i.e., "PORT CHANNEL INDEX 2'") in the port channel index column 604b, and that assigns that first LAG 900 a port channel priority value (e.g., "96") in the port channel priority value column 604c. As discussed above, the assignment of the port channel priority value to the port channel may provide the port channel identifier for that port channel (i.e., as a combination of the port channel priority and the port channel index.)

Similarly as discussed above, STP port channel priorities may include values of "0", "32", "64", "128", "160", "192", and "224", and the STP provides the port channel priority value "128" as a default value. As such, in the illustrated embodiment, the port channel priority value of "96" that is assigned to the port channel that provides the first LAG 900 in this example will provide that port channel with a "primary port channel priority" that is selected to result in a port channel identifier that causes that first LAG 900 to be selected as the active LAG to the switch devices 504 and 510 over any other port channel with the default port channel priority value of "128", as discussed in further detail below. However, while specific port channel priority values have been described, one of skill in the art in possession of the present disclosure will recognize how different techniques may be utilized to assign the first LAG a primary port channel priority that provides the same functionality discussed below while remaining within the scope of the present disclosure.

The method 700 then proceeds to decision block 706 where the first switch device determines whether subsequent communications have been received from an additional port that indicates that an additional link provided to the second switch device by that additional port is available. In an embodiment, with reference to the STP link selection system 200 of FIG. 2 and following the establishment of the first link on the first connection 206, the switch devices 204 and 202 may then establish a second link on the second connection 208, and at decision block 706 the STP link selection engine 304 in the switch device 204/300 will determine that a subsequent communication has been received from an additional port that indicates that an additional link provided to the switch device 202 by that additional port is available. With reference to specific example provided for the STP link selection system 500 above, in this embodiment of the first iteration of the method 700, at decision block 706 the first LAG 900 may be the only LAG available between the switch device 502 and the switch devices 504 and 510, and at decision block 706 the STP link selection engine 304 in the switch device 502/300 will determine that no subsequent communication has been received from an additional port channel that indicates that an additional LAG provided to the switch devices 504 and 510 by that additional port channel is available.

If, at decision block 706, the first switch device determines that the subsequent communications have been received from an additional port that indicates that an additional link provided to the second switch device by that additional port is available, the method 700 may proceed to block 708 where a first switch device performs STP link selection and determines that a port-related tiebreaker is required. As would be understood by one of skill in the art in possession of the present disclosure, switch devices operating via the STP may elect a root bridge (e.g., one of the "designated switch device(s)" in the examples discussed below) that provides a reference point for all switch devices in the STP topology, and switch devices that provide a path to the root bridge may be provided as designated bridges (e.g., the "designated switch device(s)" in the examples discussed below), with the root bridge being the one of the designated bridges with the lowest root bridge identifier. As such, one of skill in the art in possession of the present disclosure will recognize that the switch device 204 discussed as a "designated switch device" in many of the examples below may operate as a designated bridge or a root bridge depending on the STP topology and details.

For example, with reference to the STP link selection 200, the switch device 204 may be selected as a root switch device (also called a "root bridge") based on that switch device 204 having the lowest root switch device/bridge identifier (e.g., a root bridge identifier that is lower than a root bridge identifier for the switch device 202), or may be designated as a designated switch device when another switch device (not illustrated) has been elected as the root switch device. As a root bridge is a designated bridge, the switch device 204 is referred to below as "the designated switch device 204" with the understanding that it may operate as either a root bridge or a designated bridge. Following the selection of the switch device 204 as the designated switch device and the designation of the switch device 202 as the non-designated switch device (hereinafter, the "non-designated switch device 202", which may include non-root switch devices), the STP link selection engine 304 in the designated switch device 204/300 will continue STP link selection operations to determine the best path to the root switch device 202.

As discussed above, such STP link selection operations may include selecting amongst a plurality of different links available between the designated switch device 204 and the non-designated switch device 202, first based on relative root path costs of the available links, then using a "lowest designated bridge identifier" tiebreaker that is based on the designated bridge identifiers associated with the available links if the root path costs associated with the available links are the same, and then using a "lowest designated port identifier" tiebreaker that is based on the designated port identifiers that provide the available links if the designated bridge identifiers associated with the available links are the same. As such, in one example, the first link provided by the first connection 206 between the non-designated switch device 202 and the designated switch device 204, and the second link provided by the second connection 208 between the non-designated switch device 202 and the designated switch device 204 may become available as discussed above, and if the root path costs associated with the first link and the second link are the same, and the designated bridge identifiers associated with the first link and the second link are the same, the STP link selection engine 304 in the designated switch device 204/300 may determine at block 702 that a port-related tiebreaker (e.g., the "lowest designated port identifier" tiebreaker in conventional systems discussed above) is required. However, while one specific example of a port-related tiebreaker has been described, one of skill in the art in possession of the present disclosure will recognize that port-related tiebreakers (or port-channel-related tiebreakers similar to those discussed below with reference to the STP link selection system 500) may be required in variety of scenarios that will fall within the scope of the present disclosure as well The method 700 may then proceed to block 710 where the first switch device automatically assigns the additional port with a secondary port priority. In an embodiment, at block 710, switch devices included in the STP link selection system 200 and/or 500 may automatically assign a secondary port priority to any additional ports upon which additional links to neighbor switch device(s) become available. Continuing with the specific example directed to the STP link selection system 200 discussed above and with reference to FIGS. 8C and 8D, the second link provided on the second connection 208 via the port 312 on the designated switch device 204/300 may be the second link that becomes available between the designated switch device 204/300 and the non-designated switch device 202 (e.g., following the first link on the first connection 206). As such, in response to the second link provided on the second connection 208 via the port 312 on the root/designated switch device 204/300 becoming available, the STP link selection engine 304 in the root/designated switch device 204/300 may generate a row 802 in the queue 402 that indicates that that second link was the second available link to the root switch device 202 that was identified (i.e., "$2^{ND}$") in the link identification order column 402a, that includes the port index for the port 312 providing that second link (i.e., "PORT 312/'PORT INDEX 2") in the port index column 402b, and that assigns that port 312 that provides the second link a port priority value (e.g., "128") in the port priority value column 402c. As discussed above, the assignment of the port priority value to the port may provide the port identifier for that port (i.e., as a combination of the port priority and the port index.) Furthermore, in this context, "assignment" of a default port priority value may be passive, in that the lack of an active assignment of a port priority value may result (e.g., "passively assign") the default port priority value to that port.

As discussed above, STP port priorities may include values of "0", "32", "64", "128", "160", "192", and "224", and the STP provides the port priority value "128" as a default value. As such, in the illustrated embodiment, the port priority value of "128" that is assigned to the port 312 that provides the second link in this example provides that port 312 with a "secondary port priority" that is selected to cause that second link to be designated as a non-active link to the root switch device 202 relative to the first link (the "active link") provided on the first connection 206 by the port 310 that was assigned the primary port priority value of "96", as discussed above. As such, the assignment of port priority values to ports may take into consideration their associated port index in order to assure that the resulting port identifiers provide for the designation of the first link that becomes available as the active link, and the subsequent links that become available as the non-active links. However, while specific port priority values have been described, one of skill in the art in possession of the present disclosure will recognize how different techniques may be utilized to assign the port 312 a secondary port priority that provides the same functionality discussed below while remaining within the scope of the present disclosure.

Following block 710, the method 700 returns to decision block 706. As such, the method 700 will loop through decision block 706 and blocks 708 and 710 to assign a secondary port priority to any additional links provided to the second switch device by additional ports on the first switch device. If at decision block 706, the first switch device determines that the subsequent communications have not been received from an additional port that indicates that an additional link provided to the second switch device by that additional port is available, the method 700 proceeds to block 711 where the first switch device identifies the port identifiers to the second switch device. Continuing with the specific example directed to the STP link selection system 200, at block 711, the STP link selection engine 304 in the designated switch device 202/300 may communicate the port identifier of the port 310 that provides the first link on the first connection 206 to the non-designated switch device 202.

Figure 8D:
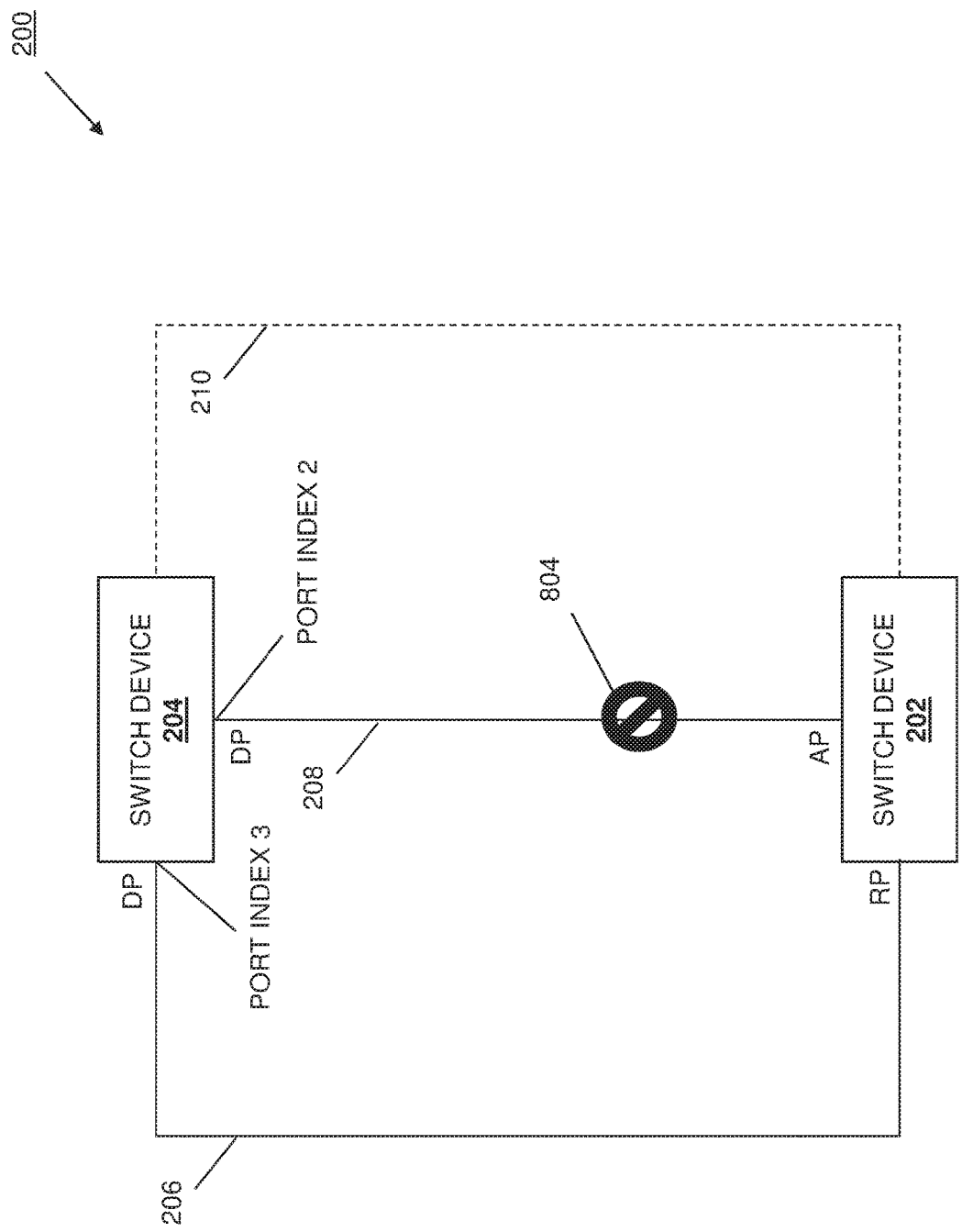
FIG. 8D is a schematic view illustrating an embodiment of the STP link selection system of FIG. 2 during the method of FIG. 7.

The method 700 proceeds to block 712 where the first switch device transmits communications via the link provided by the port assigned with the primary port priority, and blocks communications via additional link(s) provided by additional port(s) assigned with secondary port priority. In an embodiment, at block 712, switch devices included in the STP link selection system 200 and/or 500 may transmit communications over links provided by port(s) with the primary port priority, while blocking communications over links provided by port(s) with the secondary port priority. As illustrated in FIGS. 8C and 8D, the election of the switch device 204 as the designated switch device results in the ports 310 and 312 on that designated switch device 204 (which provide the first link on the first connection 206 and the second link on the second connection 208, respectively) becoming designated ports (i.e., "DP"), and the identification of the port identifier of the port 310 to the non-designated switch device 202 results in the port on the non-designated switch device 202 that provides the first link on the first connection 206 becoming a root port (i.e., "RP"), while the assignment of the secondary port priority value to the port 312 on the designated switch device 204 that provides the second link on the second connection 208 results in the port on the non-root switch device 202 that provides the second link on the second connection 208 becoming an alternate port (i.e., "AP"). In other words, the first link provided on the first connection 206 is provided as an active link on a root-designated port pair (i.e., the RP/DP pair), while the second link provided on the second connection 208 is provided as a non-active link on an alternate-designated port pair (i.e., the AP/DP pair). This is in contrast to conventional systems, which would switch the active link from being provided on the first connection 206 to being provided on the second connection 208, and would provide the non-active link on the first connection 206 due to the port 312 that provides the second connection 208 having a lower port identifier (i.e., a combination of its conventional default port priority and its lower port index "PORT INDEX 2") than the port 310 providing the first connection 206 (i.e., a combination of its conventional default port priority and its higher port index "PORT INDEX 3").

Continuing with the specific example directed to the STP link selection system 200 discussed above and with reference to FIGS. 8C and 8D, the STP link selection engine 304 and/or the communication system 308 in the non-designated switch device 202/300 may operate to transmit communications over the first link provided on the first connection 206 by the port 310 with the primary port priority, while blocking communications over the second link provided on the second connection 208 by port 312 with the secondary port priority (as illustrated by element 804.) Continuing with the specific example directed to the STP link selection system 500 discussed above and with reference to FIGS. 9A and 9B, in this embodiment of the first iteration of the method 700, the first LAG 900 is the only LAG available for transmitting communications, and the STP link selection engine 304 and/or the communication system 308 in the switch device 502/300 may operate to transmit communications over the first LAG via the port channel with the primary port channel priority.

The method 700 then proceeds to decision block 714 where the first switch device determines whether the link provided by the port assigned with the primary port priority is unavailable. As discussed in further detail below, at decision block 714, switch devices included in the STP link selection system 200 and/or 500 will monitor ports that have been assigned the primary port priority to determination whether the active link provided by that port has become unavailable. For example, the STP link selection engine 304 in the switch device 300 may be configured to monitor any of its ports 310-314 to determine when a link has become unavailable via the detection of a "link down" event, and/or using a variety of other techniques that would be apparent to one of skill in the art in possession of the present disclosure.

If, at decision block 714, the first switch device determines that the link provided by the port assigned with the primary port priority is available, the method 700 returns to decision block 706 where the first switch device again determines whether subsequent communications have been received from an additional port that indicates that an additional link provided to the second switch device by that additional port is available. Continuing with the example of the STP link selection system 200, the designated switch device 204 and the non-designated switch device 202 may then establish a third link on the third connection 210, and at decision block 706 the STP link selection engine 304 in the designated switch device 204/300 will determine that a subsequent communication has been received from an additional port that indicates that an additional link provided to the non-designated switch device 202 by that additional port is available. Continuing with the example of the STP link selection system 500 above and with reference to FIG. 9D, the switch device 502 and the switch devices 504 and 510 may then establish a second LAG 906, and at decision block 706 the STP link selection engine 304 in the switch device 502/300 will determine that a subsequent communication has been received from an additional port channel that indicates that an additional LAG provided to the switch devices 504 and 510 by that additional port channel is available.

The method 700 may then return to block 708 where the first switch device may again perform STP link selection and determine that a port-related tiebreaker is required, and block 710 where the first switch device again automatically assigns the additional port with a secondary port priority. Continuing with the specific example directed to the STP link selection system 200 discussed above and with reference to FIGS. 8E and 8F, the third link provided on the third connection 210 via the port 314 on the designated switch device 204/300 may be the third link that becomes available between the designated switch device 204/300 and the non-designated switch device 202 (e.g., following the first link on the first connection 206 and the second link on the second connection 208). As such, in response to the third link provided on the third connection 210 via the port 314 on the designated switch device 204/300 becoming available, the STP link selection engine 304 in the designated switch device 204/300 may generate a row 806 in the queue 402 that indicates that that third link was the third available link to the root switch device 202 that was identified (i.e., "3RD") in the link identification order column 402a, that includes the port index for the port 314 providing that third link (i.e., "PORT 314/'PORT INDEX 1") in the port index column 402b, and that assigns that port 314 a port priority value (e.g., "128") in the port priority value column 402c. As discussed above, the assignment of the port priority value to the port may provide the port identifier for that port (i.e., as a combination of the port priority and the port index.) Furthermore, in this context, "assignment" of a default port priority value may be passive, in that the lack of an active assignment of a port priority value may result (e.g., "passively assign") the default port priority value to that port.

As discussed above, STP port priorities may include values of "0", "32", "64", "128", "160", "192", and "224", and the STP provides the port priority value "128" as a default value. As such, in the illustrated embodiment, the port priority value of "128" that is assigned to the port 314 that provides the third link in this example will provide that port 314 with a "secondary port priority" that may be selected to cause the third link provided by that port 314 to be designated as a non-active link to the non-designated switch device 202 relative to the first link (the "active link") provided on the first connection 206 by the port 310 with the primary port priority value of "96", as discussed above. As such, the assignment of port priority values to ports may take into consideration their associated port index in order to assure that the resulting port identifiers provide for the designation of the first link that becomes available as the active link, and the subsequent links that become available as the non-active links. However, while specific port priority values have been described, one of skill in the art in possession of the present disclosure will recognize how different techniques may be utilized to assign the port 314 a secondary port priority that provides the same functionality discussed below while remaining within the scope of the present disclosure.

Continuing with the specific example directed to the STP link selection system 500 discussed above and with reference to FIGS. 9C and 9D, a second LAG 906 provided on the connections 508a-508b via a port channel on the switch device 502/300 may be the second LAG that becomes available between the switch device 502/300 and switch devices 504 and 510 (e.g., following the first LAG 900 on the connections 506a-506n). As such, in response to the second LAG 906 provided on the ports 508a-508b on the switch device 502/300 becoming available, the STP link selection engine 304 in the switch device 502/300 may generate a row 908 in the queue 602 that indicates that that second LAG 906 was the second available LAG to the switch devices 504 and 510 that was identified (i.e., "$2^{ND}$") in the LAG identification order column 602a, that includes the port channel index for the port channel providing that second LAG 906 (i.e., "PORT CHANNEL INDEX 1") in the port channel index column 602b, and that assigns the port channel that provides that second LAG 906 a port channel priority value (e.g., "128") in the port channel priority value column 602c. Similarly, the STP link selection engine 304 in the switch device 502/300 may generate a row 910 in the queue 604 that indicates that that second LAG 906 was the second available LAG to the switch devices 504 and 510 that was identified (i.e., "$2^{ND}$") in the LAG identification order column 604a, that includes the port channel index for the port channel providing that second LAG 906 (i.e., "PORT CHANNEL INDEX 1") in the port channel index column 604b, and that assigns the port channel that provides that second LAG 906 a port channel priority value (e.g., "128") in the port channel priority value column 604c. As discussed above, the assignment of the port channel priority value to the port channel may provide the port channel identifier for that port channel (i.e., as a combination of the port channel priority and the port channel index.)

Similarly as discussed above, STP port channel priorities may include values of "0", "32", "64", "128", "160", "192", and "224", and the STP provides the port channel priority value "128" as a default value. As such, in the illustrated embodiment, the port channel priority value of "128" that is assigned to the port channel that provides the second LAG 906 in this example will provide that port channel with a "secondary channel port priority" that that is selected to cause that second LAG 906 to be designated as a non-active LAG to the switch device 204 relative to the first LAG 900

(the "active LAG") provided by the port channel with the primary port channel priority value of "96", as discussed above. As such, the assignment of port channel priority values to port channels may take into consideration their associated port channel index in order to assure that the resulting port channel identifiers provide for the designation of the first LAG that becomes available as the active LAG, and the subsequent LAGs that become available as the non-active LAGs. However, while specific port channel priority values have been described, one of skill in the art in possession of the present disclosure will recognize how different techniques may be utilized to assign the port channel that provides the second LAG a secondary port channel priority that provides the same functionality discussed below while remaining within the scope of the present disclosure.

The method 700 then returns to decision block 706 where, in this example, it is determined that no subsequent communications are received that indicate that an additional link between the switch devices in the STP link selection systems 200 and/or 500 are available, and the method 700 then returns to block 711 where the first switch device may again identify the port identifiers to the second switch device. Continuing with the specific example directed to the STP link selection system 200, at block 711, the STP link selection engine 304 in the designated switch device 204/300 may have already communicated the port identifier of the port 310 that provides the first link on the first connection 206 to the non-designated switch device 202 as discussed above. Continuing with the specific example directed to the STP link selection system 500, at block 711, the STP link selection engine 304 in the switch device 502/300 may communicate the port channel identifier of the first LAG 900 to the switch devices 504 and 510.

Figure 8E:
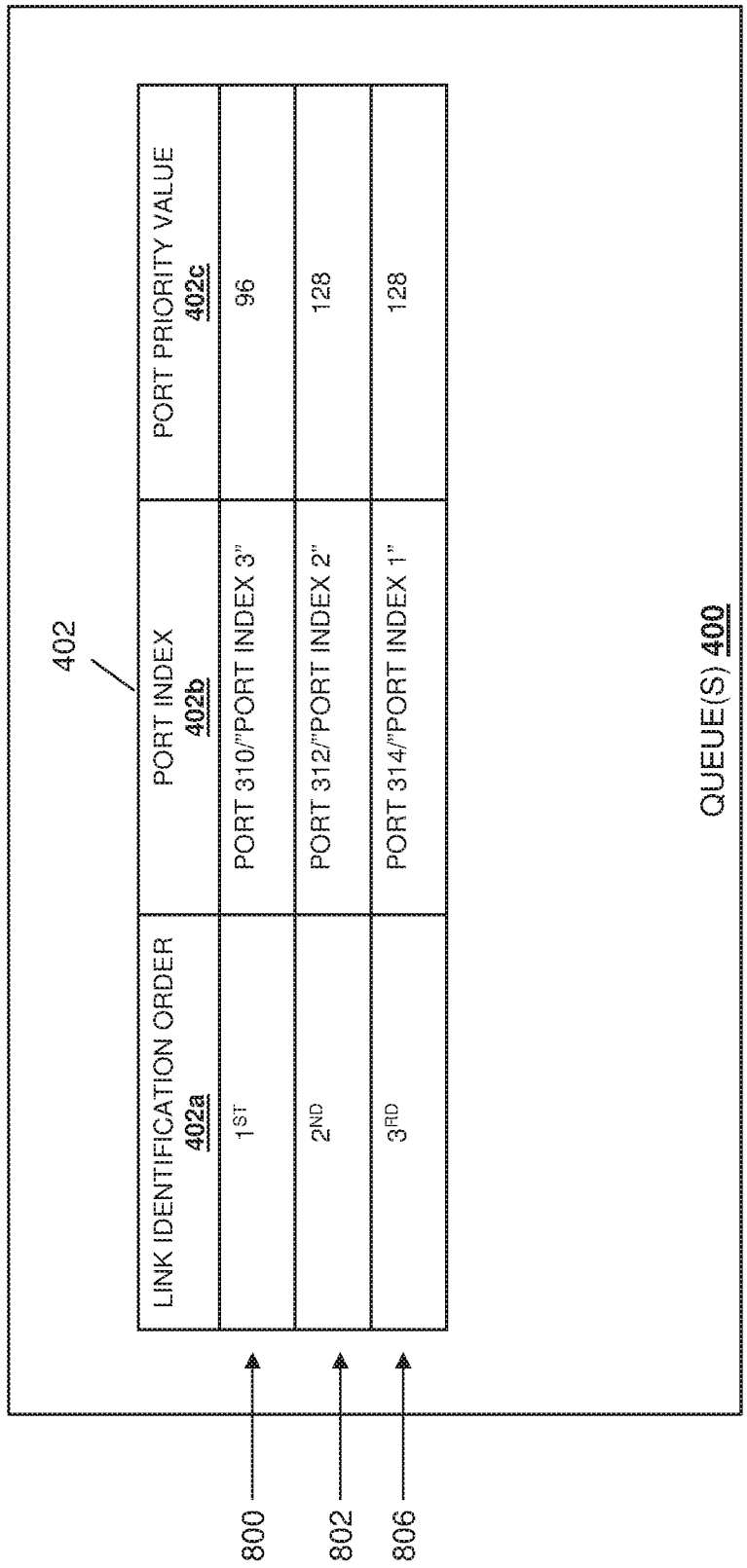
FIG. 8E is a schematic view illustrating an embodiment of the queue of FIG. 4 in the switch device of FIG. 3 in the STP link selection system of FIG. 2 during the method of FIG. 7.
Figure 8F:
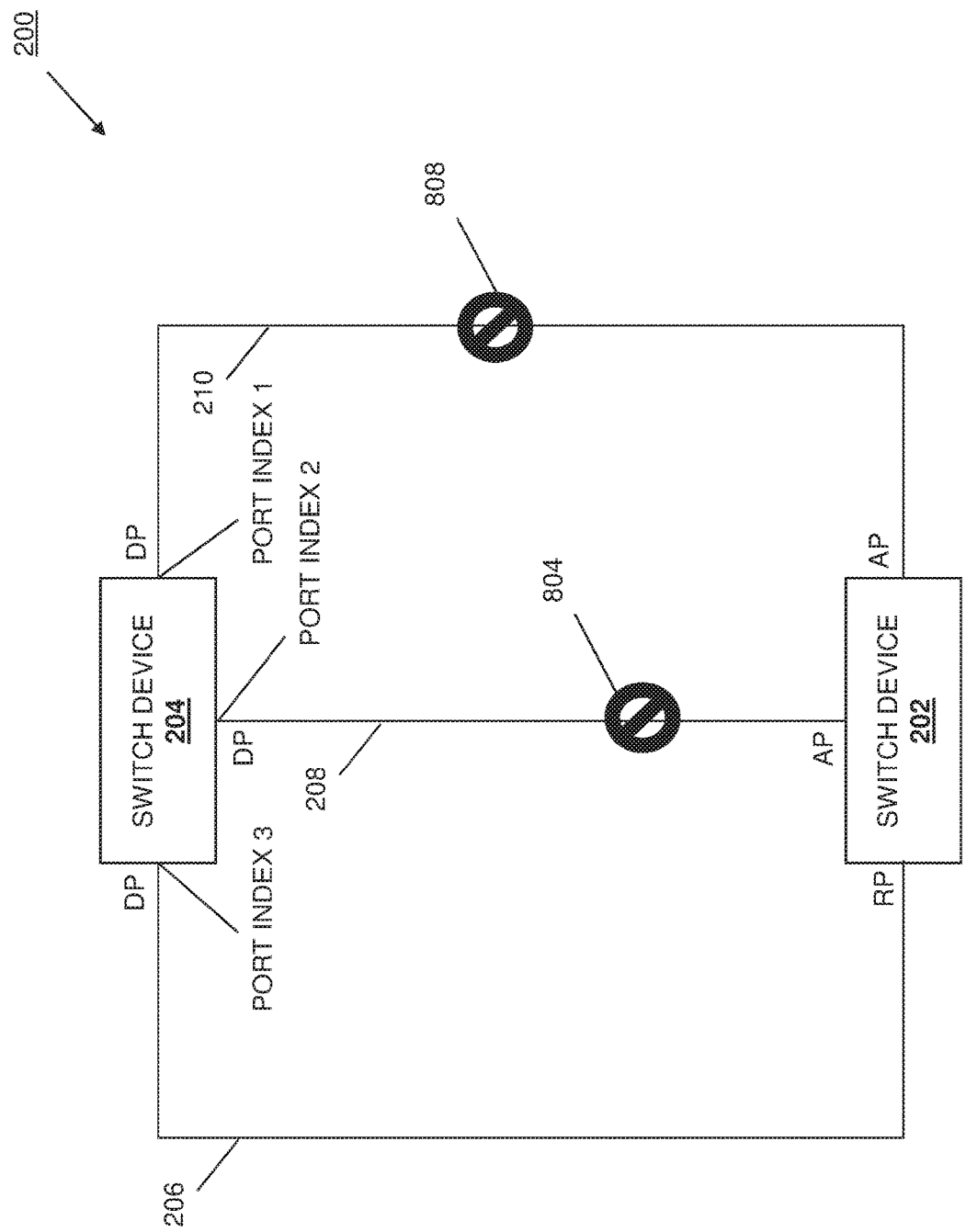
FIG. 8F is a schematic view illustrating an embodiment of the STP link selection system of FIG. 2 during the method of FIG. 7.

As illustrated in FIGS. 8E and 8F, the election of the switch device 204 as the designated switch device results in the ports on that designated switch device 204 (which also provide the third link on the third connection 210) becoming a designated port (i.e., "DP"), and the assignment of the secondary port priority value to the port 314 on the designated switch device 202 that provides the third link on the third connection 208 results in the port on the non-designated switch device 202 that provides the third link becoming an alternate port (i.e., "AP"). In other words, the first link provided on the first connection 206 is provided as an active link on a root-designated port pair (i.e., the RP/DP pair), while the second link provided on the second connection 208 and the third link provided on the third connection 210 are provided as non-active links on alternate-designated port pairs (i.e., the AP/DP pairs). This is in contrast to conventional systems, which would switch the active link from being provided on the first connection 206 to being provided on the third connection 210, and would provide the non-active links on the first connection 206 and the second connection 208 due to the port 314 that provides the third connection 210 having a lower port identifier (i.e., a combination of its conventional default port priority and its lower port index "PORT INDEX 1") than the port 310 providing the first connection 206 (i.e., a combination of its conventional default port priority and its higher port index "PORT INDEX 3") and the port 312 providing the second connection 208 (i.e., a combination of its conventional default port priority and its higher port index "PORT INDEX 2").

Figure 9C:
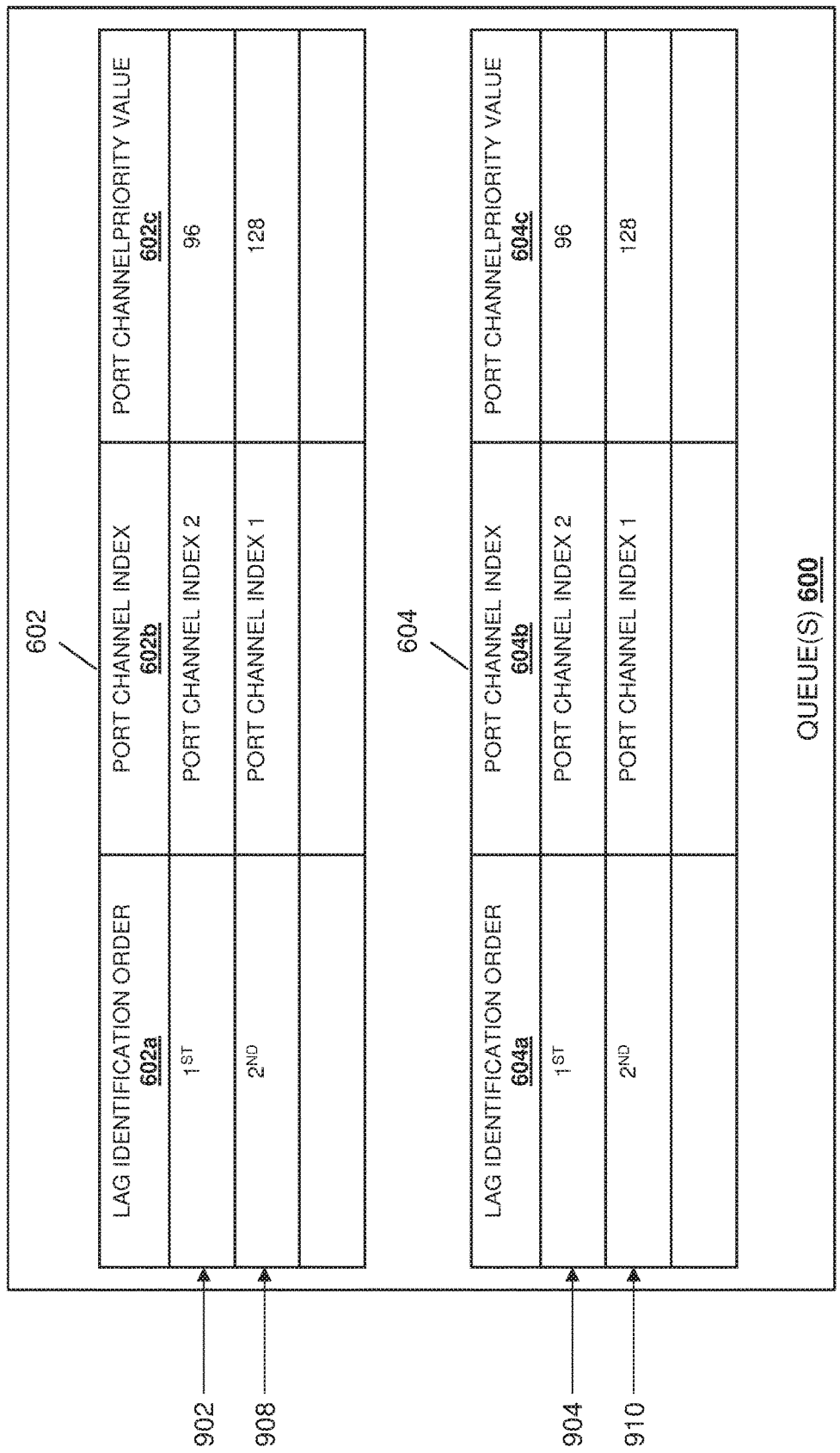
FIG. 9C is a schematic view illustrating an embodiment of the queue of FIG. 6 in the switch device of FIG. 3 in the STP link selection system of FIG. 5 during the method of FIG. 7.
Figure 9D:
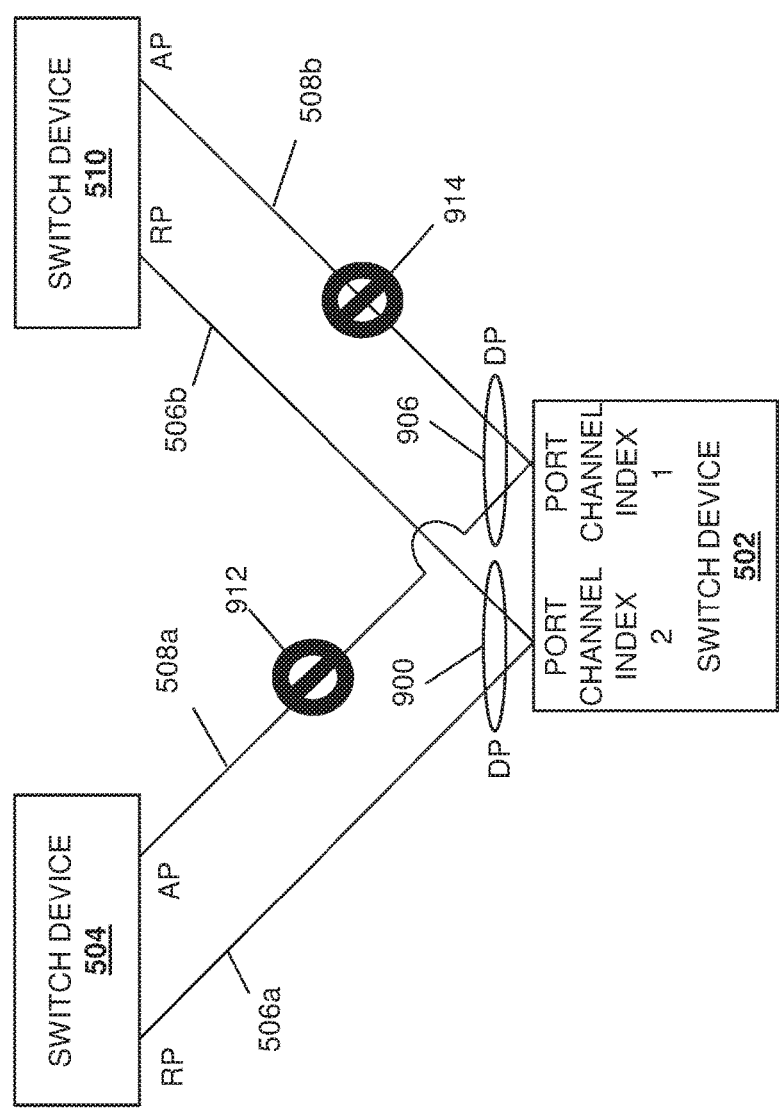
FIG. 9D is a schematic view illustrating an embodiment of the STP link selection system of FIG. 5 during the method of FIG. 7.

As illustrated in FIGS. 9C and 9D, the switch device 502 may be elected as the root/designated switch device similarly as discussed above in order to result in the first LAG 900 and the second LAG 906 being designated ports (i.e., "DP"), and the assignment of the primary port channel priority value to the port channel on the switch device 502 that provides the first LAG 900 results in the ports on the switch devices 504 and 510 opposite that first LAG 900 becoming root ports (i.e., "RP"), while the assignment of the secondary port channel priority value to the port channel on the switch device 502 that provides the second LAG 900 results in the ports on the switch devices 504 and 510 opposite that second LAG 906 becoming alternate ports (i.e., "AP"), In other words, the first LAG 900 is provided as an active LAG on root-designated port pairs (i.e., the RP/DP pairs), while the second LAG 906 is provided as non-active LAG on alternate-designated port pairs (i.e., the AP/DP pairs). This is in contrast to conventional systems, which would switch the active LAG from being provided on the first LAG 900 to being provided on the second LAG 906, and would provide the non-active LAG on the first LAG 900 due to the port channel that provides the second LAG 906 having a lower port channel identifier (i.e., a combination of its conventional default port channel priority and its lower port channel index "PORT CHANNEL INDEX 1") than the port channel that provides the second LAG 906 (i.e., a combination of its conventional default port channel priority and its lower port channel index "PORT CHANNEL INDEX 2")

The method 700 then returns to block 712 where the first switch device transmits communications via the link provided by the port assigned with the primary port priority, and blocks communications via additional link(s) provided by additional port(s) assigned with secondary port priority. Continuing with the specific example directed to the STP link selection system 200 discussed above and with reference to FIGS. 8e and 8F, the STP link selection engine 304 and/or the communication system 308 in the non-designated switch device 202/300 may operate to transmit communications over the first link provided by the port 310 with the primary port priority, while blocking communications over the second link provided by port 312 with the secondary port priority (as illustrated by element 804), and blocking communications over the third link provided by port 314 with the secondary port priority (as illustrated by element 808). Continuing with the specific example directed to the STP link selection system 500 discussed above and with reference to FIGS. 9C and 9D, the STP link selection engine 304 and/or the communication system 308 in the switch device 502/300 may operate to transmit communications over the first LAG 900 with the primary port channel priority, while blocking communications over the second LAG with the secondary port channel priority (as illustrated by elements 912 and 914).

The method 700 then returns to decision block 714 where the first switch device determines whether the link provided by the port assigned with the primary port priority is unavailable. Continuing with the specific example directed to the STP link selection system 200 discussed above and with reference to FIGS. 8G and 8H, the first link provided on the first connection 206 may become unavailable (as illustrated by the dashed line provided for the first connection 206 illustrated in FIG. 8H, which is indicative of an unavailable link in this example), and that unavailability may be detected by the STP link selection engine 304 in the designated switch device 204/300 at decision block 714. Continuing with the specific example directed to the STP link selection system 500 discussed above and with reference to FIGS. 9E and 9F, the first LAG 900 may become unavailable (as illustrated by the dashed line provided for the connections 506a-506b illustrated in FIG. 9F, which is indicative of an unavailable LAG in this example), and that unavailability by be detected by the STP link selection engine 304 in the switch device 502/300 at decision block 714.

Figure 8G:
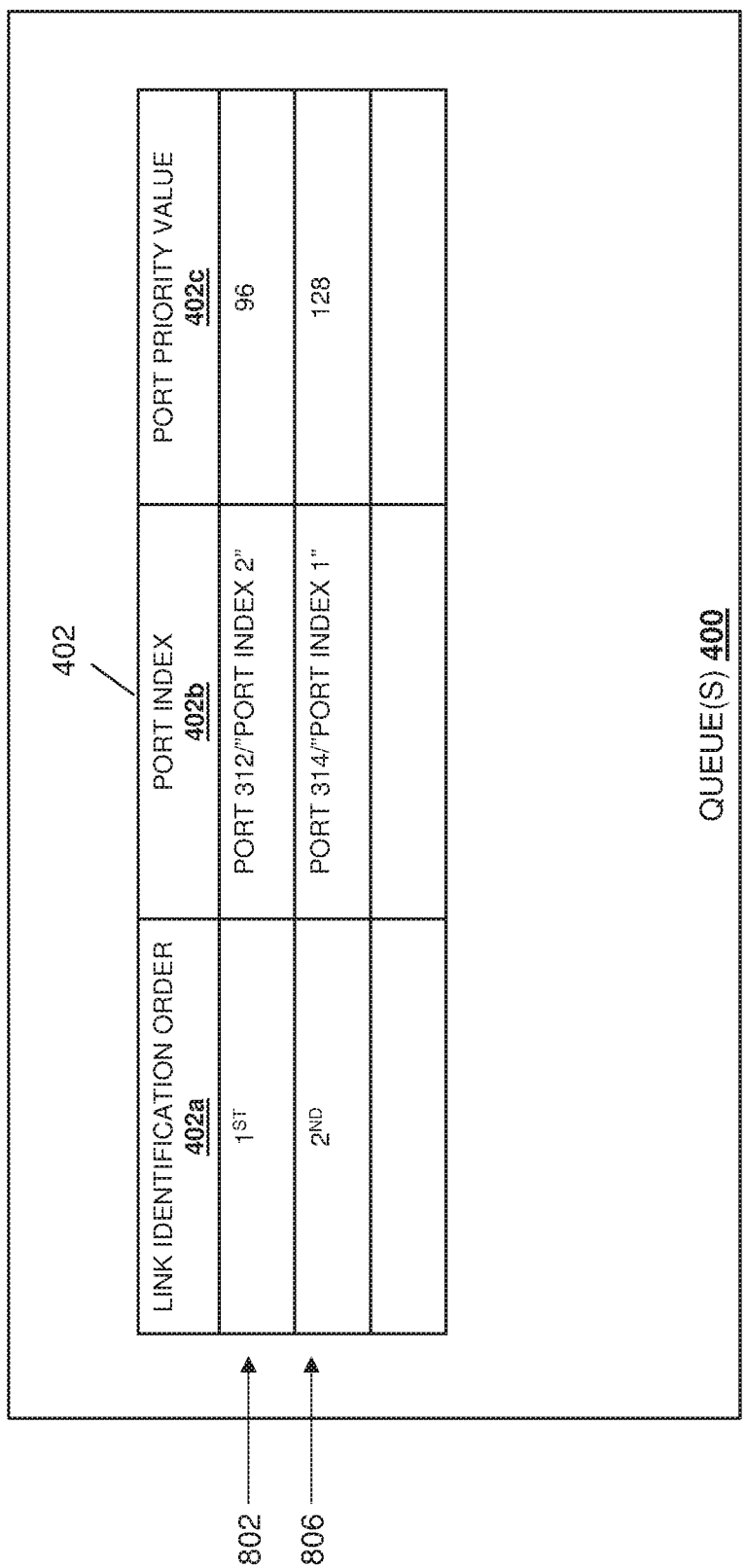
FIG. 8G is a schematic view illustrating an embodiment of the queue of FIG. 4 in the switch device of FIG. 3 in the STP link selection system of FIG. 2 during the method of FIG. 7.

If, at decision block 714, the first switch device determines that the link provided by the port assigned with the primary port priority is unavailable, the method 700 proceeds to block 716 where the first switch device automatically unassigns the primary port priority from the port to which it had been assigned, and automatically assigns the primary port priority to one of the additional port(s). Continuing with the specific example directed to the STP link selection system 200 discussed above, FIG. 8G illustrates how the row 800 for the port 310 that provides the first link provided on the first connection 206 has been removed from the queue 402 by the STP link selection engine 304 in the designated switch device 204/300, thus unassigning the primary port priority from the port 310 that provides that first link. Furthermore, FIG. 8G illustrates how the row 802 for the port 312 that provides the second link provided on the second connection 208 has been modified in the queue 402 by the STP link selection engine 304 in the designated switch device 204/300, assigning the primary port priority to the port 312 that provides that second link, and indicating that the port 312 that provides that second link now provides the first available link (of the remaining available links) to the non-root switch device 202 that was identified (i.e., "$1^{ST}$") in the link identification order column 402a. Similarly, FIG. 8G illustrates how the row 806 for the port 314 that provides the third link provided on the third connection 210 has been modified in the queue 402 by the STP link selection engine 304 in the root/designated switch device 204/300, indicating that that third link is now the second available link (of the remaining available links) to the non-root switch device 202 that was identified (i.e., "$2^{ND}$") in the link identification order column 402a.

Figure 9E:
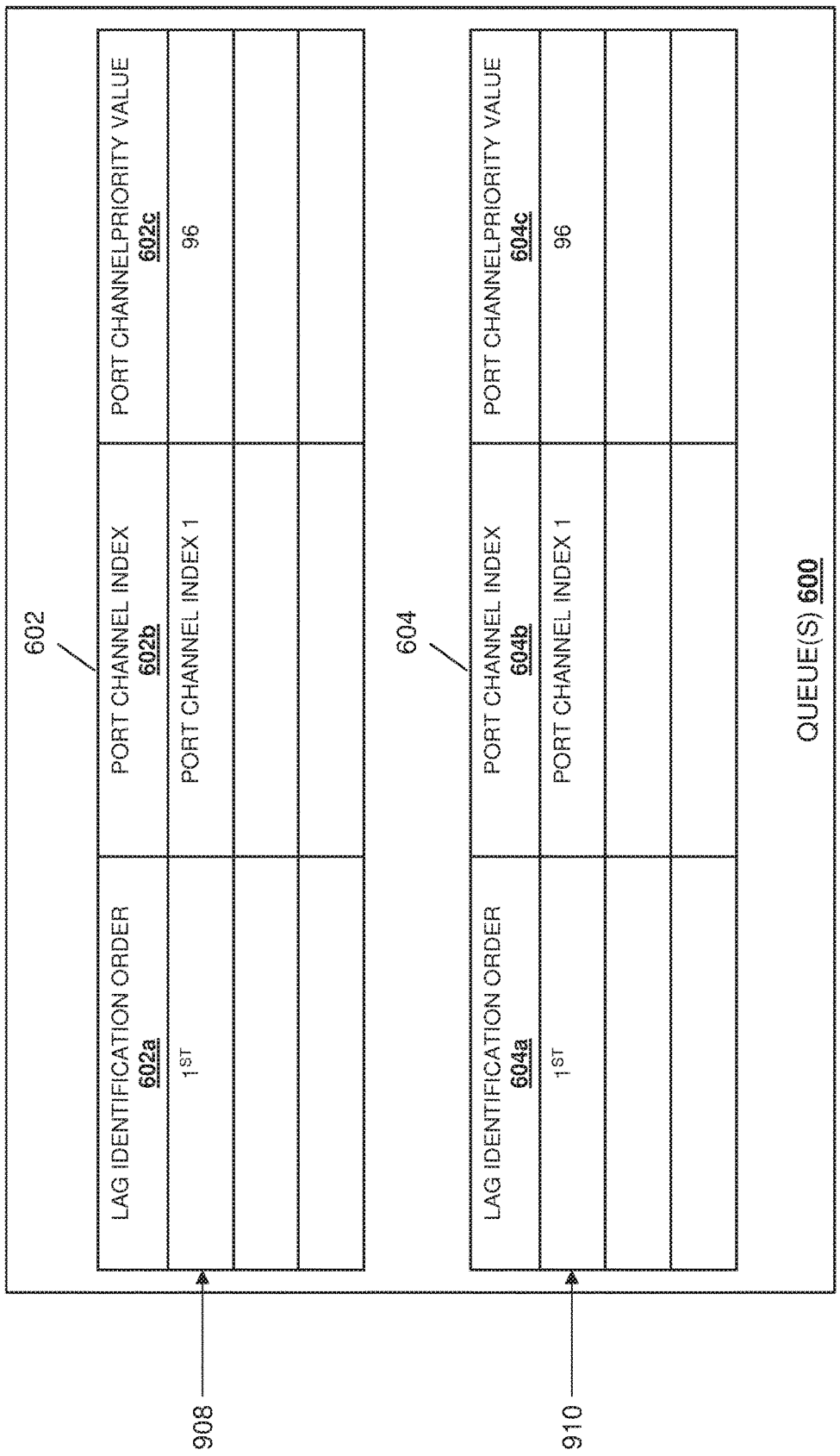
FIG. 9E is a schematic view illustrating an embodiment of the queue of FIG. 6 in the switch device of FIG. 3 in the STP link selection system of FIG. 5 during the method of FIG. 7.
Figure 9F:
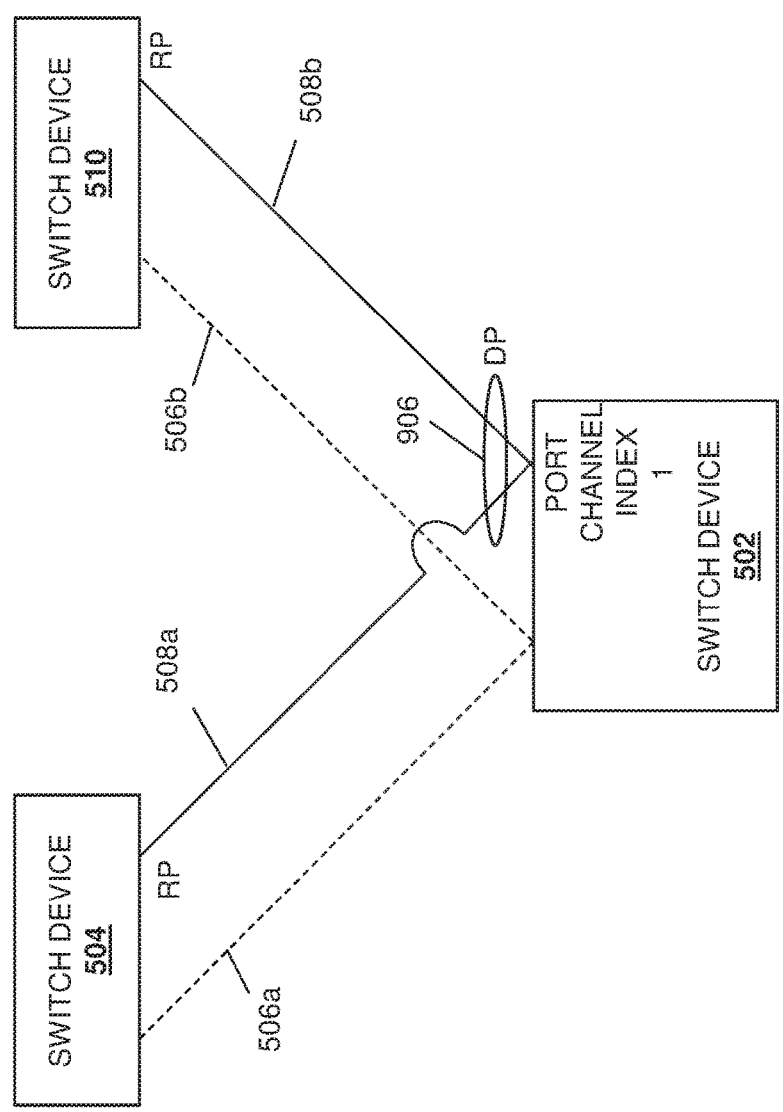
FIG. 9F is a schematic view illustrating an embodiment of the STP link selection system of FIG. 5 during the method of FIG. 7.

Continuing with the specific example directed to the STP link selection system 500 discussed above, FIG. 9E illustrates how the rows 902 and 904 for the port channel that provides the first LAG 900 have been removed from the queues 602 and 604 by the STP link selection engine 304 in the switch device 502/300, thus unassigning the primary port channel priority from the port channel that provides that first LAG 900. Furthermore, FIG. 9E illustrates how the rows 908 and 910 for the port channel that provides the second LAG 906 have been modified in the queues 602 and 604 by the STP link selection engine 304 in the switch device 502/300, assigning the primary port channel priority to the port channel that provides that second LAG 906, and indicating that that second LAG is now the first available LAG (of the remaining available LAGs) to the switch devices 504 and 510 that was identified (i.e., "$1^{ST}$") in the link identification order columns 602a and 604a.

Following block 716, the method 700 once again returns to decision block 706 and may proceed in substantially the same manner as described above. Continuing with the specific example directed to the STP link selection system 200 discussed above and with reference to FIGS. 8I and 8J, the first link provided on the first connection 206 may once again become available, and at decision block 706, the STP link selection engine 304 in the designated switch device 204/300 will determine that a subsequent communication has been received that indicates that an additional link provided to the non-designated switch device 202 by the port 310 is available. Continuing with the specific example directed to the STP link selection system 500 discussed above and with reference to FIGS. 9G and 9H, the first LAG 900 may once again become available, and at decision block 706, the STP link selection engine 304 in the switch device 502/300 will determine that a subsequent communication has been received that indicates that an additional LAG provided to the switch devices 504 and 510 is available.

The method 700 may then return to block 708 where switch devices 202 and 502 again perform STP link selection and determine that a port-related tiebreaker is required, and block 710 where the switch devices 202 and 502 again automatically assign the additional port or port channel with a secondary port priority. Continuing with the specific example directed to the STP link selection system 200 discussed above and with reference to FIGS. 8I and 8J, the first link provided on the first connection 206 via the port 310 on the designated switch device 204/300 may once again become available between the designated switch device 204/300 and the non-designated switch device 202 (e.g., following its unavailability and the assignment of the primary port priority to the second link on the second connection 208). As such, in response to the first link provided on the first connection 206 via the port 310 on the designated switch device 204/300 becoming available, the STP link selection engine 304 in the designated switch device 204/300 may generate a row 810 in the queue 402 that indicates that that first link is now the third available link to the root switch device 202 that was identified (i.e., "$3^{RD}$") in the link identification order column 402a, that includes the port index for the port 310 providing that first link (i.e., "PORT 310/'PORT INDEX 3") in the port index column 402b, and that assigns the pot 310 that provides that first link a port priority value (e.g., "128") in the port priority value column 402c. As discussed above, the assignment of the port priority value to the port may provide the port identifier for that port (i.e., as a combination of the port priority and the port index.) Furthermore, in this context, "assignment" of a default port priority value may be passive, in that the lack of an active assignment of a port priority value may result (e.g., "passively assign") the default port priority value to that port.

As discussed above, STP port priorities may include values of "0", "32", "64", "128", "160", "192", and "224", and the STP provides the port priority value "128" as a default value. As such, in the illustrated embodiment, the port priority value of "128" that is assigned to the port 310 that provides the first link in this example will provide that port 310 with a "secondary port priority" that may be selected to cause the first link to be designated as a non-active link to the non-designated switch device 202 relative to the second link (the "active link") provided on the second connection 208 with the primary port priority value of "96", as discussed above. As such, the assignment of port priority values to ports may take into consideration their associated port index in order to assure that the resulting port identifiers provide for the designation of the first currently available link that became available as the active link, and the subsequent links that became available as the non-active links. However, while specific port priority values have been described, one of skill in the art in possession of the present disclosure will recognize how different techniques may be utilized to assign the first link a secondary port priority that provides the same functionality discussed below while remaining within the scope of the present disclosure.

Figure 8I:
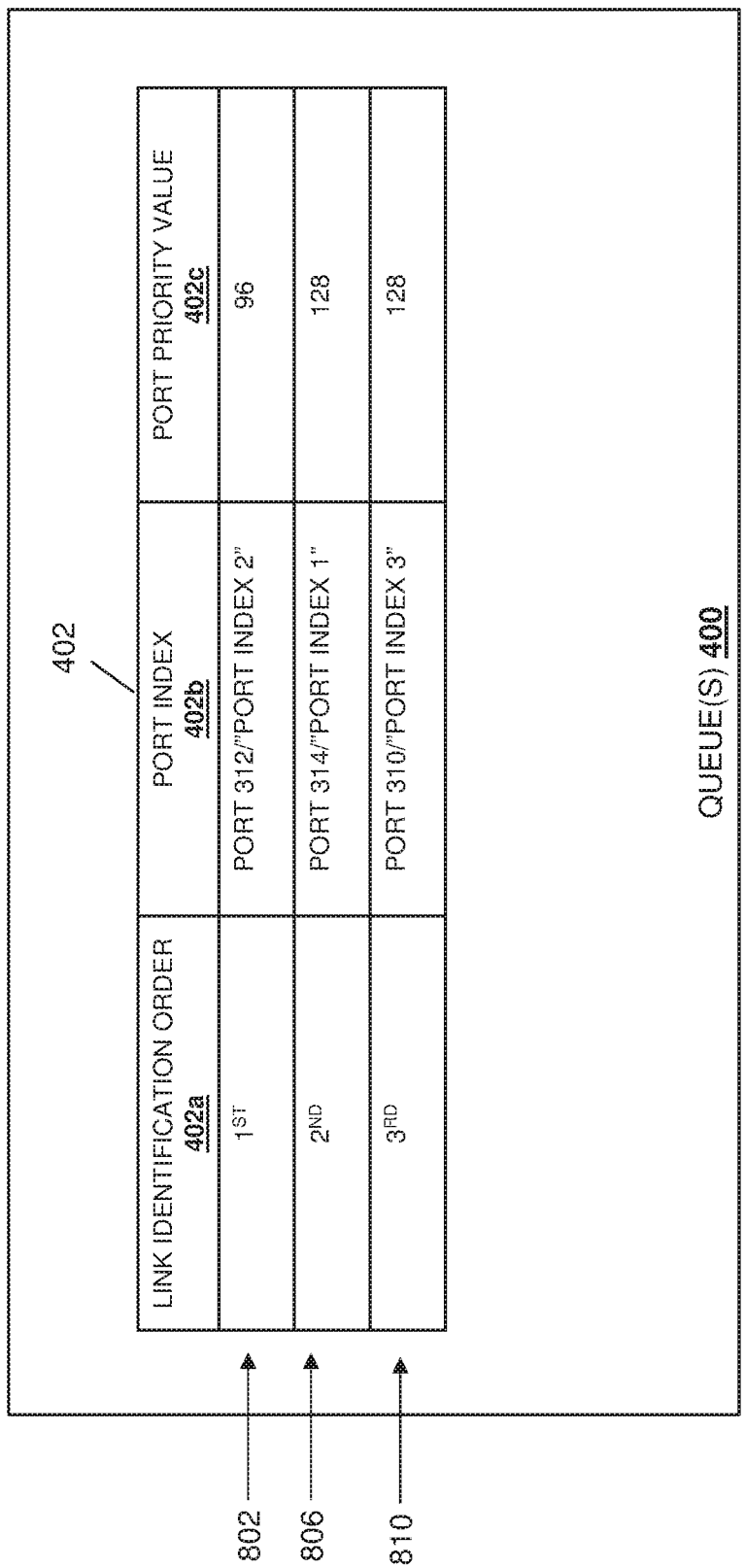
FIG. 8I is a schematic view illustrating an embodiment of the queue of FIG. 4 in the switch device of FIG. 3 in the STP link selection system of FIG. 2 during the method of FIG. 7.
Figure 8J:
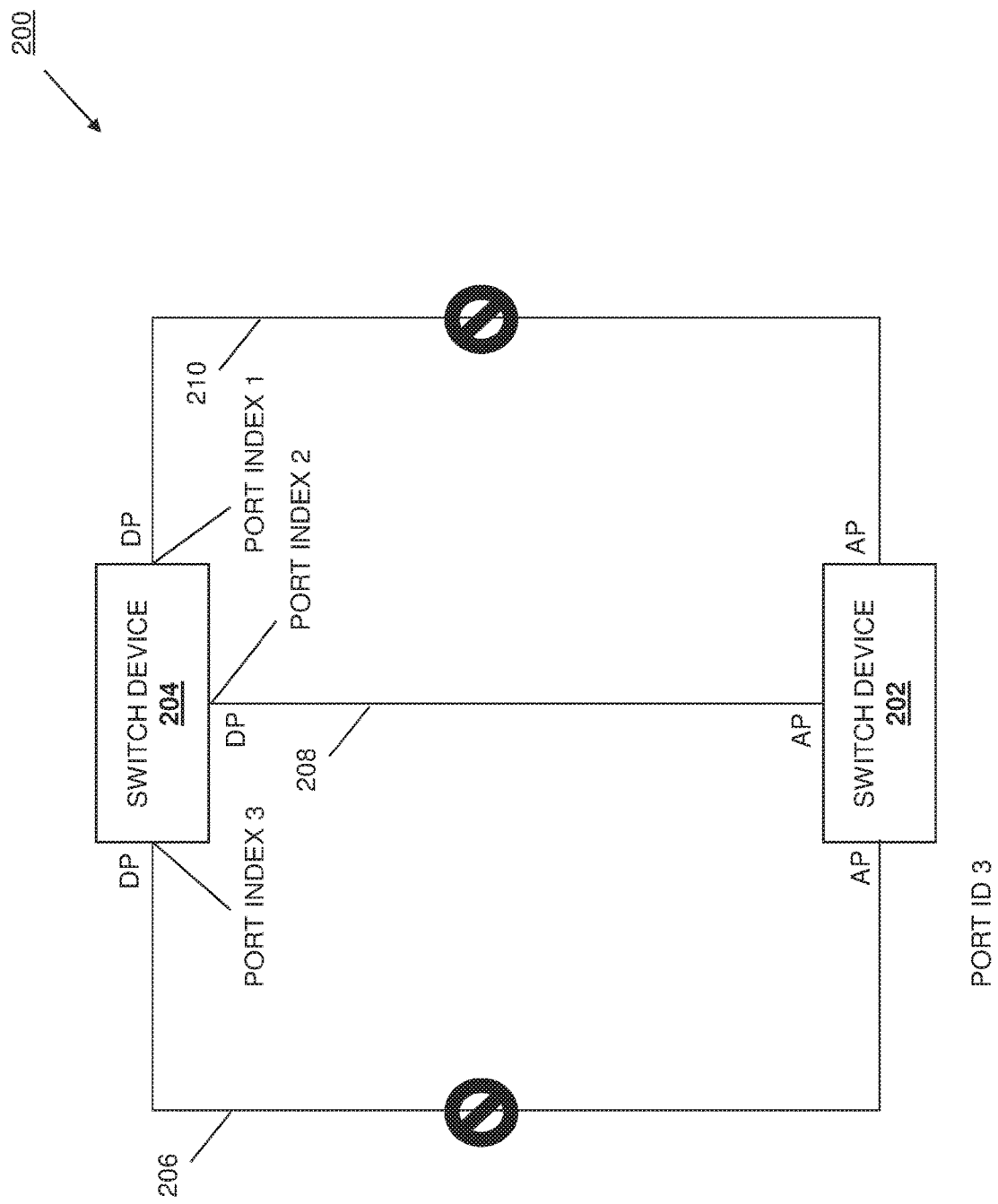
FIG. 8J is a schematic view illustrating an embodiment of the STP link selection system of FIG. 2 during the method of FIG. 7.

As illustrated in FIGS. 8I and 8J, the election of the switch device 204 as the designated switch device results in the ports on that root switch device 204 (which provide the first link on the first connection 206) becoming a designated port (i.e., "DP"), and the assignment of the secondary port priority value to the port 310 on the designated switch device 202 that provides the first link on the first connection 206 results in the port on the non-designated switch device 202 that provides the first link becoming an alternate port (i.e., "AP"). In other words, the second link provided on the second connection 208 is provided as an active link on a root-designated port pair (i.e., the RP/DP pair), while the first link provided on the first connection 206 and the third link provided on the third connection 210 are provided as non-active links on alternate-designated port pairs (i.e., the AP/DP pairs).

Continuing with the specific example directed to the STP link selection system 500 discussed above and with reference to FIGS. 9G and 9H, the first LAG 900 provided on the connections 506a-506b via a port channel on the switch device 502/300 may once again become available between the switch device 502/300 and switch devices 504 and 510 (e.g., following the first LAG 900 on the connections 506a-506b becoming unavailable). As such, in response to the first LAG 900 provided on the ports 506a-506b on the switch device 502/300 becoming available, the STP link selection engine 304 in the switch device 502/300 may generate a row 912 in the queue 602 that indicates that that first LAG 900 is now the second available LAG to the switch devices 504 and 510 that was identified (i.e., "$2^{ND}$") in the LAG identification order column 602a, that includes the port channel index for the port channel providing that first LAG 900 (i.e., "PORT CHANNEL INDEX 2") in the port channel index column 602b, and that assigns the port channel that provides that first LAG 900 a port channel priority value (e.g., "128") in the port channel priority value column 602c. Similarly, the STP link selection engine 304 in the switch device 502/300 may generate a row 914 in the queue 604 that indicates that that first LAG 900 is now the second available LAG to the switch devices 504 and 510 that was identified (i.e., "$2^{ND}$") in the LAG identification order column 604a, that includes the port channel index for the port channel providing that first LAG 900 (i.e., "PORT CHANNEL INDEX 2") in the port channel index column 604b, and that assigns the port channel that provides that first LAG 900 a port channel priority value (e.g., "128") in the port channel priority value column 604c. As discussed above, the assignment of the port channel priority value to the port channel may provide the port channel identifier for that port channel (i.e., as a combination of the port channel priority and the port channel index.)

As discussed above, STP port channel priorities may include values of "0", "32", "64", "128", "160", "192", and "224", and the STP provides the port channel priority value "128" as a default value. As such, in the illustrated embodiment, the port channel priority value of "128" that is assigned to the port channel that provides the first LAG 900 in this example will provide the port channel that provides that first LAG 900 with a "secondary channel port priority" that may be selected to cause that first LAG 900 to be designated as a non-active LAG to the switch devices 504 and 510 relative to the port channel that provides the second LAG 906 (the "active LAG") that was assigned the primary port channel priority value of "96", as discussed above. As such, the assignment of port channel priority values to port channels may take into consideration their associated port channel index in order to assure that the resulting port channel identifiers provide for the designation of the first LAG that becomes available as the active LAG, and the subsequent LAGs that become available as the non-active LAGs. However, while specific port channel priority values have been described, one of skill in the art in possession of the present disclosure will recognize how different techniques may be utilized to assign the port channel that provides the first LAG a secondary port channel priority that provides the same functionality discussed below while remaining within the scope of the present disclosure.

Figure 9G:
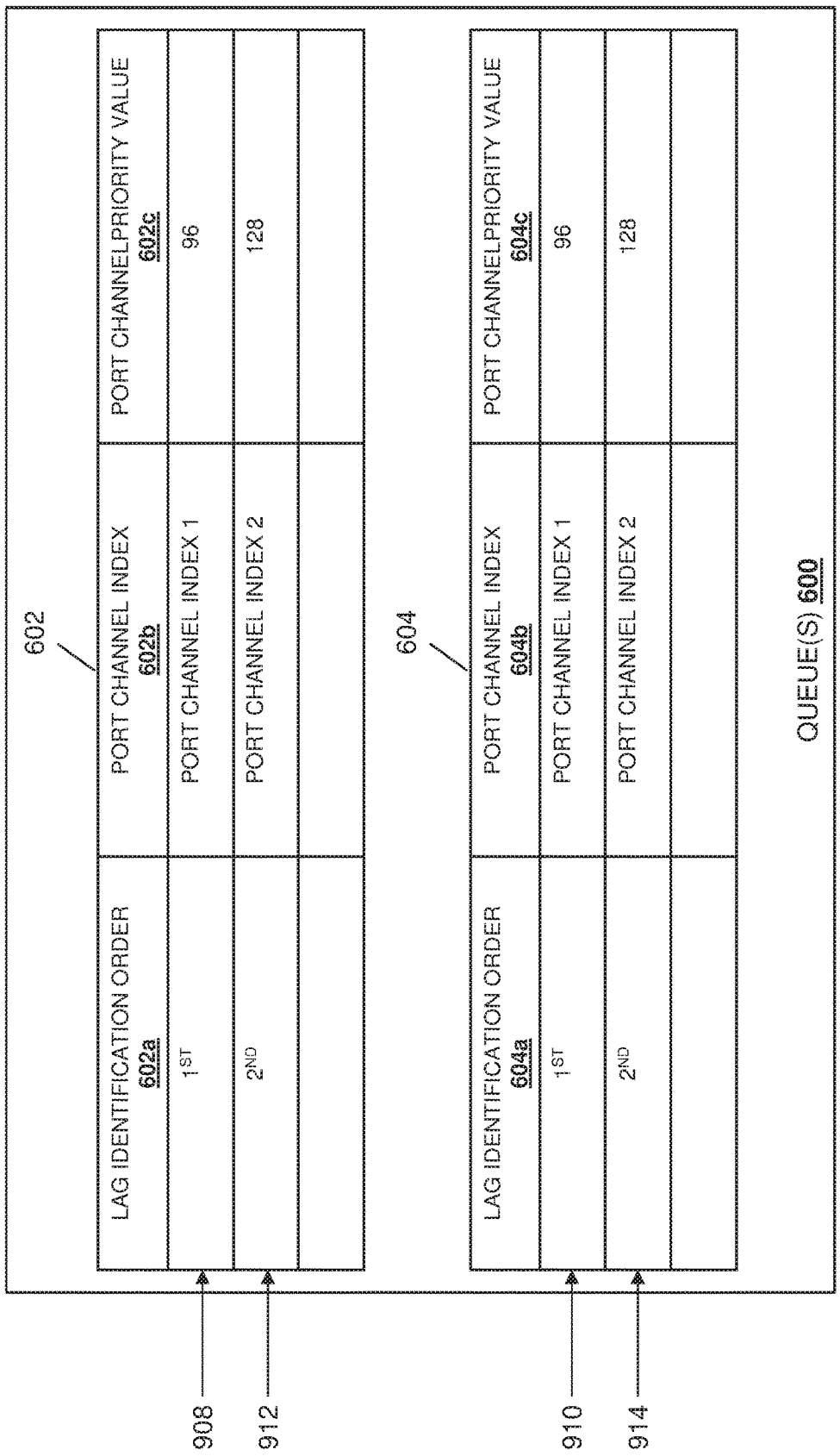
FIG. 9G is a schematic view illustrating an embodiment of the queue of FIG. 6 in the switch device of FIG. 3 in the STP link selection system of FIG. 5 during the method of FIG. 7.
Figure 9H:
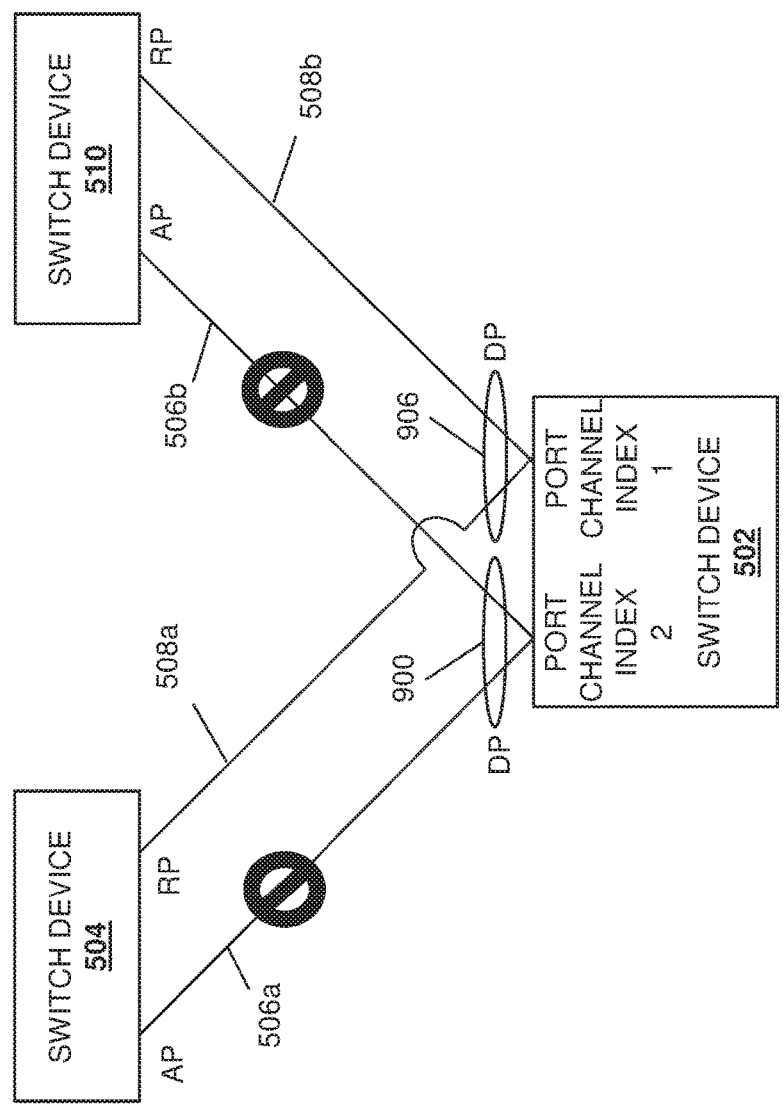
FIG. 9H is a schematic view illustrating an embodiment of the STP link selection system of FIG. 5 during the method of FIG. 7.

As illustrated in FIGS. 9G and 9H, the establishment of the first LAG 900 and the second LAG 906 on the switch device 502 results in the first LAG 900 and the second LAG 906 being designated port channels (i.e., "DP"), the assignment of the primary port channel priority value to the port channel on the switch device 502 that provides the second LAG 906 results in the ports on the switch devices 504 and 510 opposite that second LAG 906 becoming root ports (i.e., "RP"), and the assignment of the secondary port channel priority value to the port channel on the switch device 502 that provides the first LAG 900 results in the ports on the switch devices 504 and 510 opposite that first LAG 900 becoming alternate ports (i.e., "AP"), In other words, the second LAG 906 is provided as an active LAG on root-designated port pairs (i.e., the RP/DP pairs), while the first LAG 900 is provided as non-active LAG on alternate-designated port pairs (i.e., the AP/DP pairs).

As such, the method 700 may continue to be performed through any number of iterations as links (or LAGs) become available and/or unavailable, assigning the primary port priority to the port that provides the link (or primary port channel priority to the port channel that provides the LAG) that most recently became available, and assigning the secondary port priorit(ies) to the ports that provide the links (or secondary port channel priority to the port channels that provide the LAGs) that subsequently become available. As discussed above, the assigning of the primary port priority to the port that provides the link (or port channel that provides the LAG) that most recently became available provides that link (or LAG) as the active link (or active LAG) as long as it is available, thus preventing the issues discussed above in conventional systems when a link provided by a port with a lower port identifier (i.e., relative to the port identifier of the port currently providing the active link) subsequently provides an available link, or a LAG provided by a port channel with a lower port channel identifier (i.e., relative to the port channel identifier of the port channel currently providing the active LAG) subsequently provides an available LAG. In the event that active link (or active LAG) becomes unavailable, the port that provided the next most recently available link (or the port channel that provided the next most recently available LAG) is assigned the primary port priority (or port channel priority) such that it becomes the active link (or active LAG) as long as it is available, and so on.

In different embodiments, the STP link selection functionality of the present disclosure may be enabled in a switch device via, for example, a Command Line Interface (CLI) configuration option (e.g., to enable/disable the STP link selection feature relative to the default conventional STP link selection via a port identifier as discussed above). In some example, the enablement of the STP link selection functionality on the switch device may allow for the display of logs that may inform a user of the port or port channel assigned the primary port priority, the priority values of the ports with available links on the switch device (both during initial port/link selection and in port/link transition scenarios when an active link becomes unavailable), and/or other information that would be apparent to one of skill in the art in possession of the present disclosure. Furthermore, the enablement of the STP link selection functionality on the switch device may allow for show commands that display details of the queues discussed above, as well as additional details of any port/port channel and port priority/port channel priority provided. Further still, the port priority assigned to any port on the switch device may be added to the running configuration of that switch device for easy readability and access for a user.

While two specific examples are discussed herein, one of skill in the art in possession of the present disclosure will recognize that the teachings of the present disclosure may be applied to a variety of other systems while remaining within the scope of the present disclosure. For example, in situations where an high bandwidth LAG (e.g., four 10G links aggregated into a 40G LAG) is provided between switch devices, and a single high speed link (e.g., a 40G link) subsequently becomes available, the teachings of the present disclosure may automatically avoid the traffic disruptions that occur in conventional systems when a switch-over from the high bandwidth LAG to the single high speed link is typically performed (e.g., by preventing that switch-over via the assignment of the primary priority to the high bandwidth LAG and the secondary priority to the single high speed link, at least until a time at which it is determined that traffic disruptions will not occur.) In another example, in some Multiple STP (MSTP) deployments, multiple links between switch devices may be maintained as individual links rather than aggregated into a LAG, and may be mapped to corresponding Multiple Spanning Tree Instances (MSTI) (e.g., MSTI-1 and MSTI-2) to carry different Virtual Local Area Network (VLAN) traffic. The teachings of the present disclosure may be implemented with the individual links in MSTP systems in order to prevent the Common Internal Spanning Tree (CIST) from being disturbed.

Thus, systems and methods have been described that provide for port-related tiebreaker STP link selection at a designated switch device via the automatic assignment of a primary port priority to the port that provides the first link to the non-designated switch device that becomes available, while automatically assigning a secondary port priority to any additional ports that provide additional links to the non-designated switch device that subsequently become available. STP link selections based on the automatically assigned port priorities result in the first link that becomes available being utilized as an active link to transmit communications from the non-designated switch device to the designated switch device, and subsequent links that become active being non-active links that are blocked to prevent communications from being transmitted from the non-designated switch device to the designated switch device. As such, when links to the non-designated switch device subsequently become available via ports on the designated switch device, those ports are assigned the secondary port priority that makes their associated links non-active links, thus preventing the conventional functionality that results in the changing of the active link, with the associated overhead, traffic disruptions, and possible data loss discussed above. As such, the teachings of the present disclosure avoid unnecessary STP re-convergences and port role re-selections, thus eliminating operational overhead associated with hardware port state re-programming, traffic disruptions, unnecessary MAC address flushes, and associated MAC address re-learning.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Spanning Tree Protocol (STP) link selection system, comprising:
 a non-designated switch device; and
 a designated switch device that includes a plurality of ports that are each connected to the non-designated switch device, wherein the designated switch device is configured to:
  receive, from a first port that is included in the plurality of ports, a first communication that indicates that a first link provided to the non-designated switch device via the first port is available;
  automatically assign, in response to receiving the first communication, the first port with a primary port priority;
  receive, from a second port that is included in the plurality of ports and subsequent to receiving the first communication from the first port, a second communication that indicates that a second link provided to the non-designated switch device via the second port is available, wherein the second port is automatically assigned a secondary port priority that is different than the primary port priority;
  identify, to the non-designated switch device, a first port identifier that is based on the primary port priority assigned to the first port, wherein the non-designated switch device is configured to:
   transmit, based on the first identifier relative to a second port identifier that is based on the secondary port priority assigned to the second port, communications via the first link provided by the first port; and
   block, based on the second port identifier relative to the first port identifier, communications via the second link provided by the second port.

2. The system of claim 1, wherein the designated switch device includes:
 a queue that is associated with the non-designated switch device, wherein the automatically assigning the first port with the primary port priority includes automatically adding the first port to the queue and automatically associating the first port with the primary port priority in the queue in response to receiving the first communication, and wherein the automatically assigning the second port with the secondary port priority includes automatically adding the second port to the queue and automatically associating the second port with the secondary port priority in the queue in response to receiving the second communication.

3. The system of claim 1, wherein the designated switch device is configured to:
 determine that the first link provided by the first port is unavailable and, in response:
  automatically unassign the primary port priority from the first port;
  automatically unassign the secondary port priority from the second port; and
  automatically assign the second port the primary port priority.

4. The system of claim 3, wherein the designated switch device is configured to:
 automatically associate, in response to receiving the first communication, the first port with a primary position in a link identification order; and automatically associate, in response to receiving the second communication, the second port with a secondary position in the link identification order that is different than the primary position, wherein the automatic unassigning of the secondary port priority from the second port and the automatic assigning of the primary port priority to the second port is performed based on the secondary position of the second port in the link identification order.

5. The system of claim 1, wherein the designated switch device is configured to:
receive, from a third port that is included in the plurality of ports and subsequent to receiving the first communication from the first port, a third communication that indicates that a third link provided to the non-designated switch device via the third port is available, wherein the third port is automatically assigned a tertiary port priority that is different than the primary port priority, and wherein the non-designated switch device is configured to:
block, based on a third port identifier that is based on the tertiary port priority assigned to the third port relative to the first port identifier, communications via the third link provided by the third port.

6. The system of claim 1, wherein the secondary port priority is a default STP port priority value, and wherein the primary port priority is an STP port priority value that is less than the default STP port priority value.

7. An Information Handling System (IHS), comprising:
a processing system; and
a memory system that is coupled to the processing system and that includes instructions that, when executed by the processing system, cause the processing system to provide a Spanning Tree Protocol (STP) link selection engine that is configured to:
receive, from a first port, a first communication that indicates that a first link provided to a non-designated switch device via the first port is available;
automatically assign, in response to receiving the first communication, the first port with a primary port priority;
receive, from a second port and subsequent to receiving the first communication from the first port, a second communication that indicates that a second link provided to the non-designated switch device via the second port is available wherein the second port is automatically assigned a secondary port priority that is different than the primary port priority;
identify, to the non-designated switch device, a first port identifier that is based on the primary port priority assigned to the first port in order to cause the non-designated switch device to transmit communications via the first link provided by the first port based on the first port identifier relative to a second port identifier that is based on the secondary port priority assigned to the second port, and block communications via the second link provided by the second port based on the second port identifier relative to the first port identifier.

8. The IHS of claim 7, wherein the automatically assigning the first port with the primary port priority includes automatically adding the first port to a queue and automatically associating the first port with the primary port priority in the queue in response to receiving the first communication, and wherein the automatically assigning the second port with the secondary port priority includes automatically adding the second port to the queue and automatically associating the second port with the secondary port priority in the queue in response to receiving the second communication.

9. The IHS of claim 7, wherein the STP link selection engine is configured to:
determine that the first link provided by the first port is unavailable and, in response:
automatically unassign the primary port priority from the first port;
automatically unassign the secondary port priority from the second port; and
automatically assign the second port the primary port priority.

10. The IHS of claim 9, wherein the STP link selection engine is configured to:
automatically associate, in response to receiving the first communication, the first port with a primary position in a link identification order; and
automatically associate, in response to receiving the second communication, the second port with a secondary position in the link identification order that is different than the primary position, wherein the automatic unassigning of the secondary port priority from the second port and the automatic assigning of the primary port priority to the second port is performed based on the secondary position of the second port in the link identification order.

11. The IHS of claim 7, wherein the STP link selection engine is configured to:
receive, from a third port and subsequent to receiving the first communication from the first port, a third communication that indicates that a third link provided to the non-designated switch device via the third port is available, wherein the third port is automatically assigned tertiary port priority that is different than the primary port priority and that causes the non-designated switch device to block communications via the third link provided by the third port based on a third port identifier that is based on the tertiary port priority assigned to the third port relative to the first port identifier.

12. The IHS of claim 7, wherein the secondary port priority is a default STP port priority value, and wherein the primary port priority is an STP port priority value that is less than the default STP port priority value.

13. The IHS of claim 7, wherein the first port is associated with a first port identifier value, and wherein the second port is associated with a second port identifier value that is less than the first port identifier value.

14. A method for selecting Spanning Tree Protocol links, comprising:
receiving, by a designated switch device from a first port on the designated switch device, a first communication that indicates that a first link provided to a non-designated switch device via the first port is available;
automatically assigning, by the designated switch device in response to receiving the first communication, the first port with a primary port priority;
receiving, by the designated switch device from a second port and subsequent to receiving the first communication from the first port, a second communication that indicates that a second link provided to the non-designated switch device via the second port is available, wherein the second port is automatically assigned a secondary port priority that is different than the primary port priority;

identify, by the designated switch device to the non-designated switch device, a first port identifier that is based on the primary port priority assigned to the first port in order to cause the non-designated switch device to transmit communications via the first link provided by the first port based on the first port identifier relative to a second port identifier that is based on the secondary port priority assigned to the second port, and block communications via the second link provided by the second port based on the second port identifier relative to the first port identifier.

15. The method of claim 14, wherein the automatically assigning the first port with the primary port priority includes automatically adding the first port to a queue and automatically associating the first port with the primary port priority in the queue in response to receiving the first communication, and wherein the automatically assigning the second port with the secondary port priority includes automatically adding the second port to the queue and automatically associating the second port with the secondary port priority in the queue in response to receiving the second communication.

16. The method of claim 14, further comprising:
determining, by the designated switch device that the first link provided by the first port is unavailable and, in response:
automatically unassign the primary port priority from the first port;
automatically unassign the secondary port priority from the second port; and
automatically assign the second port the primary port priority.

17. The method of claim 16, further comprising:
automatically associating, by the designated switch device in response to receiving the first communication, the first port with a primary position in a link identification order; and
automatically associating, by the designated switch device in response to receiving the second communication, the second port with a secondary position in the link identification order that is different than the primary position, wherein the automatic unassigning of the secondary port priority from the second port and the automatic assigning of the primary port priority to the second port is performed based on the secondary position of the second port in the link identification order.

18. The method of claim 14, further comprising:
receiving, by the designated switch device from a third port and subsequent to receiving the first communication from the first port, a third communication that indicates that a third link provided to the non-designated switch device via the third port is available, wherein the third port is automatically assigned a tertiary port priority that is different than the primary port priority and that causes the non-designated switch device to block communications via the third link provided by the third port based on a third port identifier that is based on the tertiary port priority assigned to the third port relative to the first port identifier.

19. The method of claim 14, wherein the secondary port priority is a default STP port priority value, and wherein the primary port priority is an STP port priority value that is less than the default STP port priority value.

20. The method of claim 14, wherein the first port is associated with a first port identifier value, and wherein the second port is associated with a second port identifier value that is less than the first port identifier value.

* * * * *